United States Patent
Koike

(10) Patent No.: US 10,089,328 B2
(45) Date of Patent: Oct. 2, 2018

(54) INFORMATION PROCESSING SYSTEM, METHOD FOR CONTROLLING INFORMATION PROCESSING SYSTEM, PROGRAM, AND INFORMATION RECORDING MEDIUM CAPABLE OF GROUPING OBJECTS WITHOUT NEEDING TO PRE-DEFINE A GROUP ASSOCIATED WITH A SORTING CONDITION

(75) Inventor: Hiroyuki Koike, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 389 days.

(21) Appl. No.: 14/369,193

(22) PCT Filed: Dec. 29, 2011

(86) PCT No.: PCT/JP2011/080534
§ 371 (c)(1),
(2), (4) Date: Aug. 7, 2014

(87) PCT Pub. No.: WO2013/099037
PCT Pub. Date: Jul. 4, 2013

(65) Prior Publication Data
US 2015/0006538 A1 Jan. 1, 2015

(51) Int. Cl.
*G06F 17/30* (2006.01)
*G06F 3/0486* (2013.01)
(Continued)

(52) U.S. Cl.
CPC ...... *G06F 17/30247* (2013.01); *G06F 3/0486* (2013.01); *G06F 3/04817* (2013.01);
(Continued)

(58) Field of Classification Search
CPC ......... G06F 17/30247; G06F 17/30598; G06F 17/30994
(Continued)

(56) References Cited

U.S. PATENT DOCUMENTS

2008/0229223 A1 9/2008 Kake
2008/0229248 A1 9/2008 Fagans et al.
(Continued)

FOREIGN PATENT DOCUMENTS

JP 2003-091545 A 3/2003
JP 2008-234054 A 10/2008
JP 2009-104338 A 5/2009

OTHER PUBLICATIONS

International Search Report for PCT/JP2011/080534 dated Feb. 21, 2012.
(Continued)

*Primary Examiner* — Tony Mahmoudi
*Assistant Examiner* — Michael Le
(74) *Attorney, Agent, or Firm* — HEA Law PLLC

(57) ABSTRACT

Provided is an information processing system capable of grouping objects without needing to pre-define a group associated with a sorting condition. A determination unit determines whether or not one of a first object and a second object different from the first object is included in a determination region that is set based on a position of another one of the first object and the second object. A grouping unit groups the first object and the second object based on a result of a comparison between the attribute information associated with the first object and the attribute information associated with the second object in a case where it is determined that the one of the first object and the second object is included in the determination region.

11 Claims, 19 Drawing Sheets

(51) Int. Cl.
*G06F 3/0481* (2013.01)
*G06K 9/62* (2006.01)

(52) U.S. Cl.
CPC .. *G06F 17/30598* (2013.01); *G06F 17/30994* (2013.01); *G06K 9/622* (2013.01); *G06K 9/627* (2013.01)

(58) Field of Classification Search
USPC .......................................................... 707/740
See application file for complete search history.

(56) References Cited

U.S. PATENT DOCUMENTS

2008/0235211 A1* 9/2008 Saund ............... G06F 17/30961
2009/0077158 A1* 3/2009 Riley ................. G06Q 30/0277
709/202
2009/0106705 A1 4/2009 Takamura et al.

OTHER PUBLICATIONS

Watanabe, N et al., "Bubbleclusters: an interface formanipulating spatial aggregation ofgraphical objects", Proceedings ofthe 20th annual ACM symposiumon User interface software andtechnology, 2007, [retrieved frominternet on Apr. 18, 2018]<URL: http://www-ui.is.s.u-tokyo.ac.jp/~takeo/papers/watanabe_uist2007_bubble.pdf>.
Office Action dated Dec. 14, 2017, for corresponding AU Patent ApplicationNo. 2011384474.

* cited by examiner

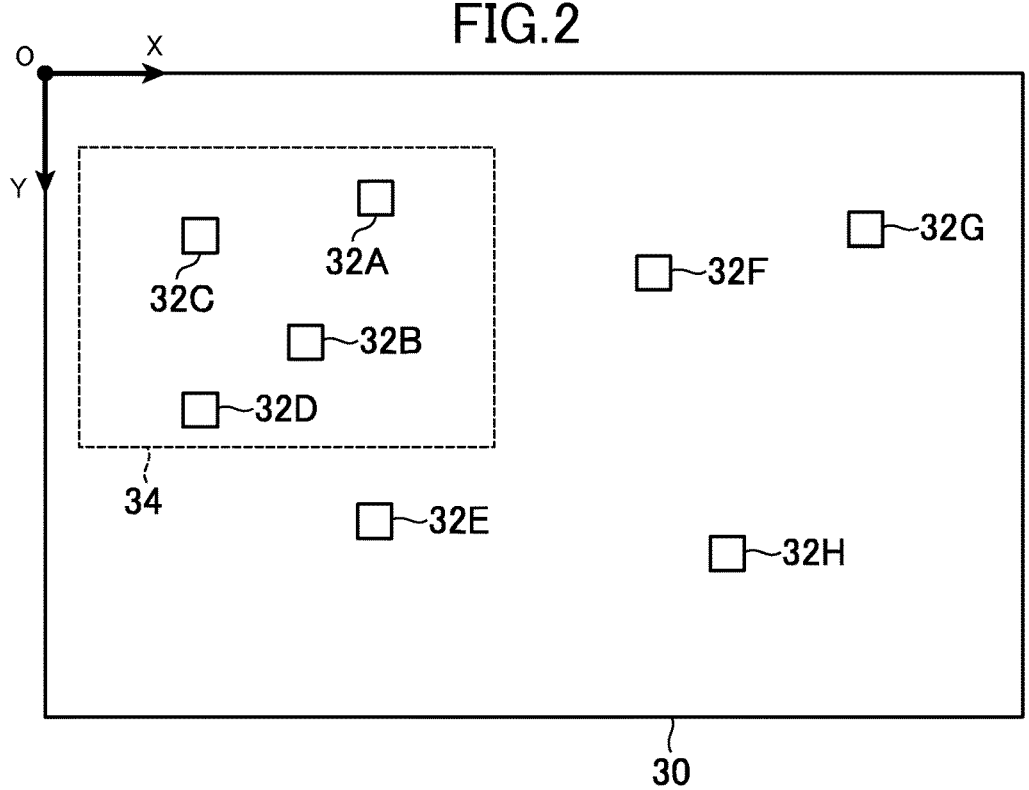

FIG.4

| OBJECT ID | IMAGE | POSITIONAL INFORMATION | ATTRIBUTE INFORMATION |
|---|---|---|---|
| A | PRODUCT IMAGE A | (xa, ya) | ------ |
| B | PRODUCT IMAGE B | (xb, yb) | ------ |
| C | PRODUCT IMAGE C | (xc, yc) | ------ |
| D | PRODUCT IMAGE D | (xd, yd) | ------ |
| E | PRODUCT IMAGE E | (xe, ye) | ------ |
| F | PRODUCT IMAGE F | (xf, yf) | ------ |
| G | PRODUCT IMAGE G | (xg, yg) | ------ |
| H | PRODUCT IMAGE H | (xh, yh) | ------ |

FIG.5

| OBJECT GROUP ID | MEMBER | POSITIONAL INFORMATION |
|---|---|---|
| 1 | A | (x1, y1) |
| 2 | B | (x2, y2) |
| 3 | C | (x3, y3) |
| 4 | D | (x4, y4) |
| 5 | E | (x5, y5) |
| 6 | F | (x6, y6) |
| 7 | G | (x7, y7) |
| 8 | H | (x8, y8) |

| OBJECT GROUP ID | MEMBER | POSITIONAL INFORMATION |
|---|---|---|
| 1 | A | (x1, y1) |
| ... | ... | ... |
| 8 | H | (x8, y8) |
| 9 | A, C | (x9, y9) |

| OBJECT GROUP ID | MEMBER | POSITIONAL INFORMATION |
|---|---|---|
| 1 | A | (x1, y1) |
| ... | ... | ... |
| 8 | H | (x8, y8) |
| 9 | A, C | (x9, y9) |
| 10 | B, C | (x10, y10) |

| OBJECT GROUP ID | MEMBER | POSITIONAL INFORMATION |
|---|---|---|
| 1 | A | (x1, y1) |
| ... | ... | ... |
| 8 | H | (x8, y8) |
| 9 | A, C | (x9, y9) |
| 10 | B, C | (x10, y10) |
| 11 | A, B, C | (x11, y11) |

| OBJECT GROUP ID | MEMBER | POSITIONAL INFORMATION |
|---|---|---|
| 1 | A | (x1, y1) |
| ... | ... | ... |
| 8 | H | (x8, y8) |
| 10 | B, C | (x10, y10) |
| 11 | A, B | (x11, y11) |
| 12 | C, D | (x12, y12) |

| OBJECT GROUP ID | MEMBER | POSITIONAL INFORMATION |
|---|---|---|
| 1 | A | (x1, y1) |
| ... | ... | ... |
| 8 | H | (x8, y8) |
| 11 | A, B | (x11, y11) |

| USER ID | DISPLAY TARGET REGION |
|---------|----------------------|
| U001 | ----- |
| U002 | ----- |
| ... | ... |

FIG.26

| OBJECT GROUP ID | MEMBER | POSITIONAL INFORMATION |
|---|---|---|
| 1 | A | (x1, y1) |
| ... | ... | ... |
| 8 | H | (x8, y8) |
| 9 | A, C | (x9, y9) |
| 10 | A, B, C | (x10, y10) |

FIG.29

| NUMBER OF OBJECTS (n) | REFERENCE DISTANCE (r) |
|---|---|
| $0 < n \leq N1$ | R1 |
| $N1 < n \leq N2$ | R2 |
| $N2 < n$ | R3 |

FIG.30

| CATEGORY | ATTRIBUTE ITEM |
|---|---|
| CATEGORY A | ATTRIBUTE ITEM A, B, C |
| CATEGORY B | ATTRIBUTE ITEM A, C, D |
| ... | ... |

INFORMATION PROCESSING SYSTEM, METHOD FOR CONTROLLING INFORMATION PROCESSING SYSTEM, PROGRAM, AND INFORMATION RECORDING MEDIUM CAPABLE OF GROUPING OBJECTS WITHOUT NEEDING TO PRE-DEFINE A GROUP ASSOCIATED WITH A SORTING CONDITION

CROSS REFERENCE TO RELATED APPLICATIONS

This application is a National Stage of International Application No. PCT/JP2011/080534 filed Dec. 29, 2011, the content of which is incorporated herein by reference in its entirety.

TECHNICAL FIELD

The present invention relates to an information processing system, a method of controlling an information processing system, a program, and an information storage medium.

BACKGROUND ART

There are various methods proposed as a method of grouping objects. For example, there is known a method in which, as disclosed in Patent Literature 1, a group (such as folder or category) associated with a sorting condition is pre-defined to sort an object into the group associated with the sorting condition satisfied by the object.

CITATION LIST

Patent Literature

[Patent Literature 1] JP 2003-91545 A

SUMMARY OF INVENTION

Technical Problem

However, in such a method as described above, it is necessary to pre-define a group (such as folder or category) associated with a sorting condition.

The present invention has been made in view of the above-mentioned problem, and an object thereof is to provide an information processing system, a method of controlling an information processing system, a program, and an information storage medium, which are capable of grouping objects without needing to pre-define a group associated with a sorting condition.

Solution to Problem

In order to solve the above-mentioned problem, an information processing system according to one embodiment of the present invention is an information processing system, including: attribute information storage means for storing attribute information associated with each of a plurality of objects placed in a virtual two-dimensional plane or a virtual three-dimensional space; determination means for determining whether or not one of a first object and a second object different from the first object is included in a determination region that is set based on a position of another one of the first object and the second object in a case where the first object is newly placed in the virtual two-dimensional plane or the virtual three-dimensional space based on a user's operation or in a case where the position of the first object is updated based on the user's operation; and grouping means for grouping the first object and the second object based on a result of a comparison between the attribute information associated with the first object and the attribute information associated with the second object in a case where it is determined that the one of the first object and the second object is included in the determination region.

Further, a method of controlling an information processing system according to one embodiment of the present invention is a method of controlling an information processing system, the method including: a step of referring to at least a part of a stored content of attribute information storage means for storing attribute information associated with each of a plurality of objects placed in a virtual two-dimensional plane or a virtual three-dimensional space; a determination step of determining whether or not one of a first object and a second object different from the first object is included in a determination region that is set based on a position of another one of the first object and the second object in a case where the first object is newly placed in the virtual two-dimensional plane or the virtual three-dimensional space based on a user's operation or in a case where the position of the first object is updated based on the user's operation; and a grouping step of grouping the first object and the second object based on a result of a comparison between the attribute information associated with the first object and the attribute information associated with the second object in a case where it is determined that the one of the first object and the second object is included in the determination region.

Further, a program according to one embodiment of the present invention is a program for causing a computer to function as: means for referring to at least a part of a stored content of attribute information storage means for storing attribute information associated with each of a plurality of objects placed in a virtual two-dimensional plane or a virtual three-dimensional space; determination means for determining whether or not one of a first object and a second object different from the first object is included in a determination region that is set based on a position of another one of the first object and the second object in a case where the first object is newly placed in the virtual two-dimensional plane or the virtual three-dimensional space based on a user's operation or in a case where the position of the first object is updated based on the user's operation; and grouping means for grouping the first object and the second object based on a result of a comparison between the attribute information associated with the first object and the attribute information associated with the second object in a case where it is determined that the one of the first object and the second object is included in the determination region.

Further, a computer-readable information storage medium according to one embodiment of the present invention is a computer-readable information storage medium storing a program for causing a computer to function as: means for referring to at least a part of a stored content of attribute information storage means for storing attribute information associated with each of a plurality of objects placed in a virtual two-dimensional plane or a virtual three-dimensional space; determination means for determining whether or not one of a first object and a second object different from the first object is included in a determination region that is set based on a position of another one of the first object and the second object in a case where the first object is newly placed in the virtual two-dimensional plane or the virtual three-dimensional space based on a user's operation or in a case where the position of the first object is updated based on the user's operation; and grouping means for grouping the first object and the second object based on a result of a comparison between the attribute information associated with the first object and the attribute information associated with the second object in a case where it is determined that the one of the first object and the second object is included in the determination region.

Further, in an aspect of the present invention: the attribute information may include: information relating to a category; and information relating to an attribute item other than the category; the information processing system may further include: means for storing comparison target item data in which a category condition relating to the category is associated with the attribute item other than the category to be used as a comparison target; and comparison means for comparing the attribute information associated with the first object and the attribute information associated with the second object in terms of the attribute item associated with the category condition satisfied by the category associated with the first object and the category associated with the second object; and the grouping means may group the first object and the second object based on a result of a comparison performed by the comparison means in the case where it is determined that the one of the first object and the second object is included in the determination region.

Further, in an aspect of the present invention, the information processing system may further include means for controlling an area of the determination region based on a number of objects placed in the virtual two-dimensional plane or the virtual three-dimensional space.

Further, in an aspect of the present invention, the information processing system may further include means for controlling an area of the determination region based on a density the plurality of objects.

Further, in an aspect of the present invention, the information processing system may further include means for grouping the object belonging to a first object group and the object belonging to a second object group based on a result of a comparison between the attribute information corresponding to the first object group and the attribute information corresponding to the second object group in a case where the first object group obtained by grouping the first object and the second object is generated by the grouping means in a state in which the second object already belongs to the second object group.

Further, in an aspect of the present invention, the information processing system may further include means for grouping the first object and the object belonging to an object group based on a result of a comparison between the attribute information associated with the first object and the attribute information corresponding to the object group in the case where it is determined that the one of the first object and the second object is included in the determination region in a state in which the second object already belongs to the object group.

Further, in an aspect of the present invention, the information processing system may further include: means for determining whether or not one of the first object and an object group is included in a determination region that is set based on the position of another one of the first object and the object group in the case where the first object is newly placed in the virtual two-dimensional plane or the virtual three-dimensional space, or in the case where the position of the first object is updated, in a state in which the object group already exists; and means for grouping the first object and the object belonging to the object group based on a result of a comparison between the attribute information associated with the first object and the attribute information corresponding to the object group in a case where it is determined that the one of the first object and the object group is included in the determination region.

Further, in an aspect of the present invention, the information processing system may further include means for removing the object from an object group to which the object belongs in a case where the object is removed from the virtual two-dimensional plane or the virtual three-dimensional space based on the user's operation.

Further, in an aspect of the present invention, the information processing system may further include: means for determining whether or not one of the object and an object group to which the object belong is included in a determination region that is set based on the position of another one of the object and the object group in a case where the position of the object placed in the virtual two-dimensional plane or the virtual three-dimensional space is changed based on the user's operation; and means for removing the object from the object group in a case where it is determined that the one of the object and the object group is not included in the determination region.

Further, in an aspect of the present invention, the information processing system may further include: means for displaying a screen indicating at least a part of the virtual two-dimensional plane or the virtual three-dimensional space on display means; and means for displaying an advertisement corresponding to the object group generated by the grouping means in a position within the screen corresponding to the position of the object group.

Further, in an aspect of the present invention, the information processing system may further include: means for displaying a screen indicating a display target region of the virtual two-dimensional plane or the virtual three-dimensional space on each of a plurality of display means, the display target region being set for each of the plurality of display means; and means for placing an advertisement object corresponding to the object group generated by the grouping means in an overlapping region of a plurality of display target regions respectively corresponding to the plurality of display means in a case where the object group is included in the overlapping region.

Advantageous Effects of Invention

According to one embodiment of the present invention, it becomes possible to group objects without needing to pre-define a group associated with a sorting condition.

BRIEF DESCRIPTION OF DRAWINGS

FIG. 2 is a diagram illustrating an example of a virtual two-dimensional plane.

FIG. 3 is a diagram illustrating an example of a screen.

FIG. 4 is a diagram showing an example of an object table.

FIG. 5 is a diagram showing an example of an object group table.

FIG. 26 is a diagram for explaining a change in the object group table.

FIG. 29 is a diagram showing an example of correspondence information.

FIG. 30 is a diagram showing an example of a comparison target item table.

DESCRIPTION OF EMBODIMENTS

Now, an embodiment of the present invention is described in detail by taking an example with reference to the accompanying drawings.

Figure 1:
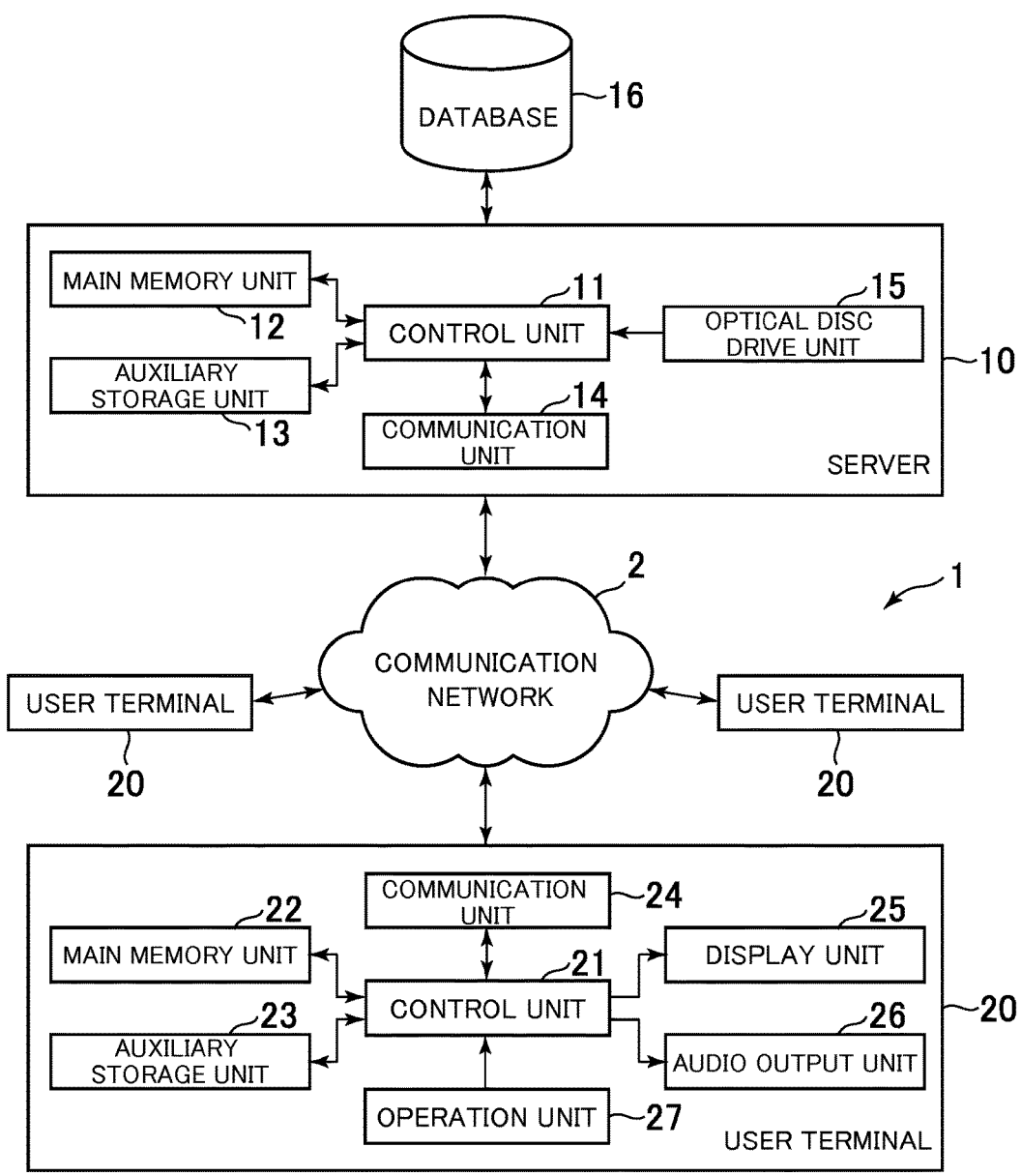
FIG. 1 is a diagram illustrating an example of an overall configuration of an information processing system according to an embodiment of the present invention.

FIG. 1 illustrates an example of an overall configuration of an information processing system 1 according to the embodiment of the present invention. As illustrated in FIG. 1, the information processing system 1 according to this embodiment includes a server 10, a database 16, and a plurality of user terminals 20. The server 10 and the plurality of user terminals 20 are connected to a communication network 2 including, for example, the Internet, which allows interactive data communications between the server 10 and each of the user terminals 20.

The server 10 includes a control unit 11, a main memory unit 12, an auxiliary storage unit 13, a communication unit 14, and an optical disc drive unit 15. The control unit 11 includes, for example, one or a plurality of CPUs, and executes information processing in accordance with an operation system or a program stored in the auxiliary storage unit 13. The main memory unit 12 is, for example, a RAM, and the auxiliary storage unit 13 is, for example, a hard disk drive or a solid-state drive. The communication unit 14 serves to perform the data communications through the communication network 2. The optical disc drive unit 15 serves to read the program and data recorded on an optical disc (information storage medium).

For example, the program and the data are supplied to the auxiliary storage unit 13 via the optical disc (information storage medium). That is, the program and the data stored in the optical disc are read by the optical disc drive unit 15 and stored in the auxiliary storage unit 13. Note that, the server 10 may include a component for reading a program or data stored in an information storage medium (for example, memory card) other than the optical disc. Then, the program and the data may be supplied to the auxiliary storage unit 13 via the information storage medium (for example, memory card) other than the optical disc. Further, the program and data may be supplied to the auxiliary storage unit 13 through the communication network 2.

The server 10 is allowed to access the database 16. Note that, the database 16 may be built in the server 10, or may be built in a server other than the server 10.

The user terminal 20 is an information processing device used by a user. The user terminal 20 includes a control unit 21, a main memory unit 22, an auxiliary storage unit 23, a communication unit 24, a display unit 25, an audio output unit 26, and an operation unit 27. The control unit 21, the main memory unit 22, the auxiliary storage unit 23, and the communication unit 24 are the same as the control unit 11, the main memory unit 12, the auxiliary storage unit 13, and the communication unit 14 of the server 10, respectively.

For example, the program and data are supplied to the auxiliary storage unit 23 through the communication network 2. Note that, the user terminal 20 may include an optical disc drive unit. Then, the program and the data may be supplied to the auxiliary storage unit 23 via the optical disc (information storage medium). Further, the user terminal 20 may include a component for reading a program or data stored in an information storage medium (for example, memory card) other than the optical disc. Then, the program and the data may be supplied to the auxiliary storage unit 23 via the information storage medium (for example, memory card) other than the optical disc.

The display unit 25 is, for example, a liquid crystal display or an organic EL display, and displays various screens. The audio output unit 26 is, for example, a speaker or a headphone terminal, and outputs various kinds of audio.

The operation unit 27 allows the user to perform an operation. For example, a pointing device for allowing the user to designate a position within the screen displayed on the display unit 25 is provided as the operation unit 27. For example, the user terminal 20 includes a touch panel provided on the display unit 25. Note that, for example, a mouse or a stick may be provided to the user terminal 20 instead of the touch panel.

In the information processing system 1, communications can be performed between users. The communications between the users may be realized when, for example, text data or audio data is exchanged between the user terminals 20 directly or through the server 10.

In particular, in the information processing system 1, the user is allowed to group various kinds of information while performing communications to/from another user. Such a grouping function is described below. Note that, the grouping function is described below by taking an exemplary case of grouping product information pieces.

In the information processing system 1, a virtual two-dimensional plane common to a plurality of users is built. FIG. 2 illustrates an example of the virtual two-dimensional plane. A plurality of objects 32A to 32H are arranged in a virtual two-dimensional plane 30 illustrated in FIG. 2. Note that, in the following description, the objects 32A to 32H may be referred to generically as object 32.

For example, the virtual two-dimensional plane 30 is a virtual plane that imitates a desk. Further, the objects 32 are objects corresponding to the product information pieces, for example, product images.

In the information processing system 1, a partial region of the virtual two-dimensional plane 30 is set as a display target region 34, and a screen showing the display target region 34 is displayed on the display unit 25 of the user terminal 20. FIG. 3 illustrates an example of the screen displayed on the display unit 25 of the user terminal 20. Note that, the display target region 34 is set for each user terminal 20, and the display target region 34 moves in accordance with the user's operation.

Before the operation performed by the user in order to group the product information pieces is described, a description is made of data stored in the database 16. FIG. 4 and FIG. 5 show an example of the data stored in the database 16.

FIG. 4 shows an example of an object table. The object table is data relating to the object 32. The object table shown in FIG. 4 includes object ID, image, positional information, and attribute information fields.

The object ID field stores information (object ID) for uniquely identifying the object 32. In the example described here, the object 32 corresponds to the product information piece, and hence the object ID also serves as information for uniquely identifying a product information piece. Note that, the object 32 whose object ID is A corresponds to the object 32A in FIG. 2. In the same manner, the objects 32 whose object IDs are B to H correspond to the objects 32B to 32H, respectively, in FIG. 2.

The image field stores information indicating the product image corresponding to the object 32. The positional information field stores the positional information relating to a position of the object 32. The positional information on the object 32 is information indicating a representative point (for example, center point or top left vertex) of the object 32 by using an X-Y coordinate system. Note that, the X-Y coordinate system is a coordinate system in which, as illustrated in FIG. 2, the top left vertex of the virtual two-dimensional plane 30 is set as a point of origin O with a rightward direction set as a positive X-axis direction and a downward direction set as a positive Y-axis direction.

The attribute information field stores attribute information associated with the object 32. The attribute information field stores attribute values of a plurality of attribute items. In the example described here, the object 32 corresponds to the product information piece, and hence the attribute information on the product is stored in the attribute information field. For example, the attribute value of such attribute items as described below are stored in the attribute information field.

category and subcategory
color
base price (regular price) and present price
release date FIG. 5 shows an example of an object group table. The object group table is data relating to an object group. The object group table shown in FIG. 5 includes object group ID, member, and positional information fields.

The object group ID field stores identification information (object group ID) for uniquely identifying the object group. Note that, in the following description, the object group whose object group ID is i is referred to as an object group i. The member field stores the object ID of the object 32 belonging to the object group.

The positional information field stores information indicating the position of the representative point of the object group. The representative point of the object group is set based on the position of the object 32 belonging to the object group. For example, in a case where two objects 32 belong to the object group, a midpoint between the representative points (for example, center points or top left vertices) of those two objects 32 is set as the representative point of the object group. Further, for example, in a case where three or more objects 32 belong to the object group, a center-of-gravity of the representative points of those objects 32 is set as the representative point of the object group. Note that, in a case where only one object 32 belongs to the object group, the representative point of the object 32 is set as the representative point of the object group.

Note that, FIG. 5 shows an initial state of the object group table. In the object group table shown in FIG. 5, each of the objects 32A to 32H is registered as one object group in advance. Note that, it is not essential to register those object groups in the object group table in advance.

Figure 6:
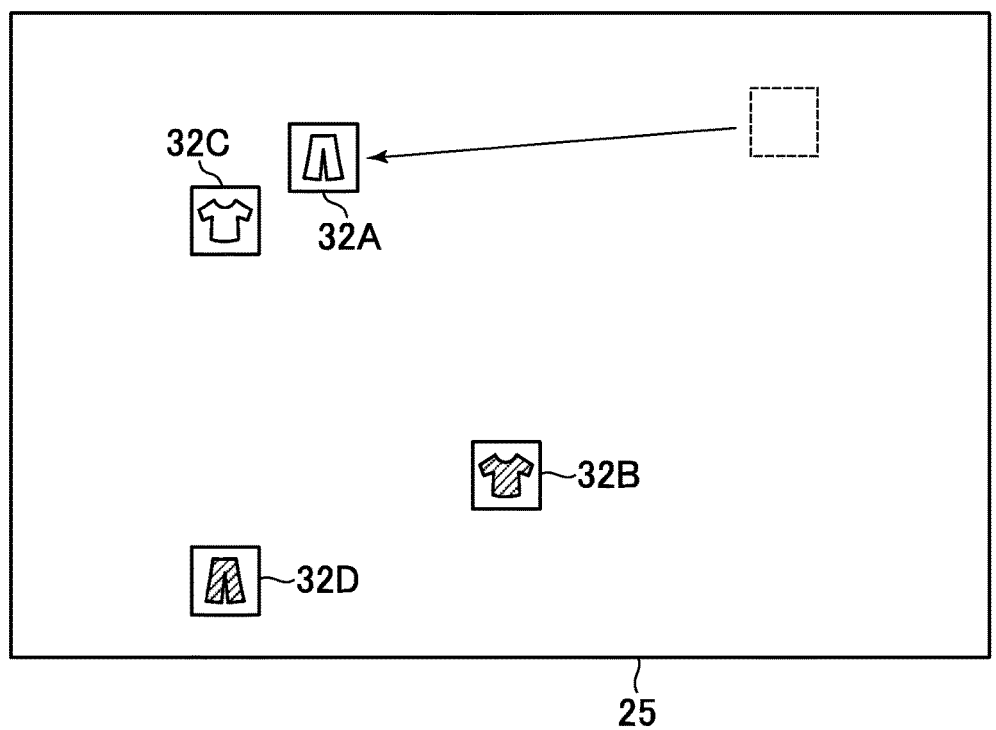
FIG. 6 is a diagram illustrating an example of an operation performed by a user.

Next, a description is made of the operation performed by the user in order to group the product information pieces. FIG. 6 is a diagram for illustrating the operation performed by the user in a case of grouping the objects 32A and 32C. In the case of grouping the objects 32A and 32C, as illustrated in FIG. 6, the user moves the object 32A to the vicinity of the object 32C. For example, the user points at the object 32A by bringing his/her finger into contact with the touch panel, and slides the finger on the touch panel without releasing the finger therefrom, to thereby move the object 32A.

Figure 7:
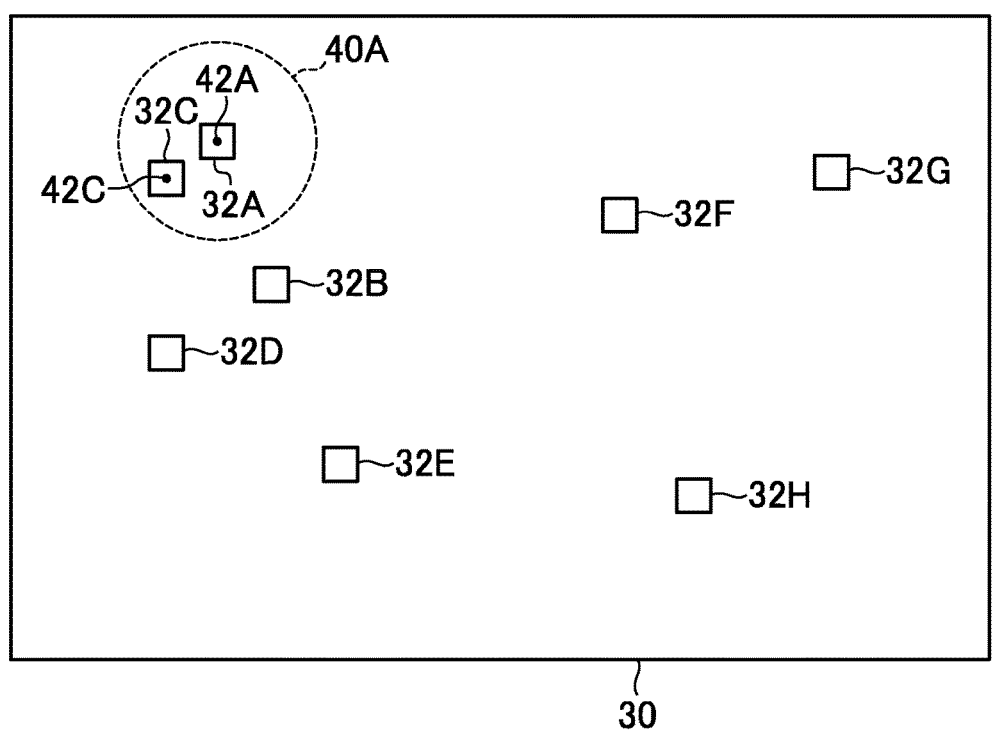
FIG. 7 is a diagram for explaining grouping processing.

FIG. 7 is a diagram for illustrating processing executed when the object 32A is moved as illustrated in FIG. 6. When the object 32A is moved as illustrated in FIG. 6, it is determined whether or not another object 32 exists in a determination region 40A set based on the position of the object 32A. In other words, another object 32 placed in the determination region 40A of the object 32A is detected. Note that, the determination region 40A is a region within a reference distance from a representative point 42A (for example, center point) of the object 32A.

In the case of an example illustrated in FIG. 7, the object 32C is included in the determination region 40A of the object 32A. In this case, the attribute information on the object 32A and the attribute information on the object 32C are compared with each other. For example, the attribute values are compared between the attribute information on the object 32A and the attribute information on the object 32C in terms of each of the plurality of attribute items.

Then, it is determined whether or not the objects 32A and 32C can be grouped based on a result of the above-mentioned comparison. When a similarity degree between the attribute information on the object 32A and the attribute information on the object 32C is equal to or higher than a reference similarity degree, it is determined that the objects 32A and 32C can be grouped. For example, when the number of attribute items whose attribute values are the same or similar is equal to or larger than a reference number of items, it is determined that the objects 32A and 32C can be grouped. Alternatively, it may be determined that the objects 32A and 32C can be grouped when a ratio of the number of attribute items whose attribute values are the same or similar to a total number of attribute items of a comparison target is equal to or higher than a reference ratio.

Figures 8, 9:
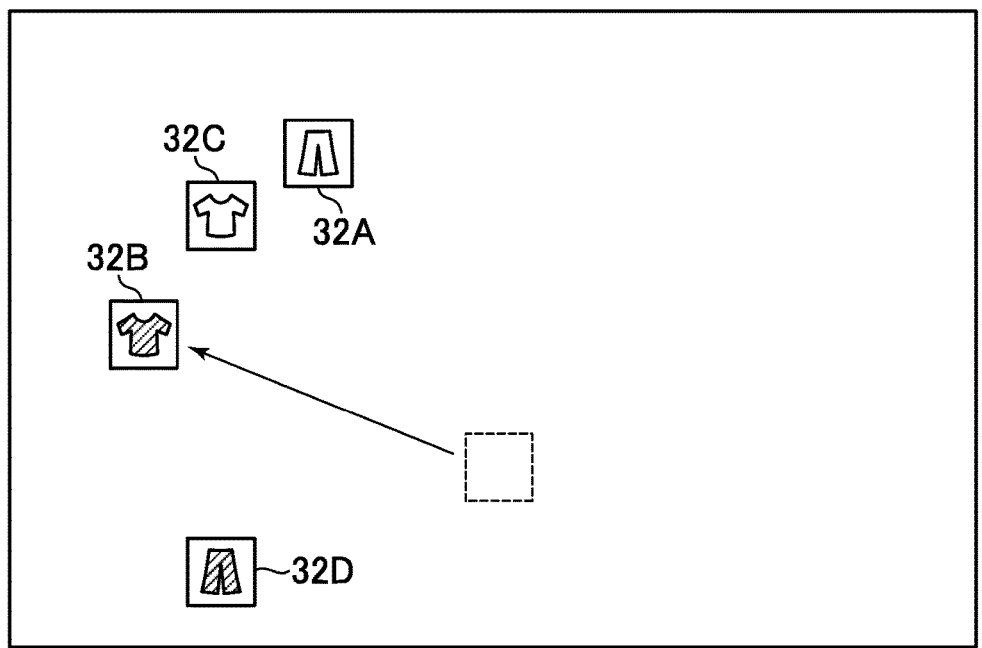
FIG. 8 is a diagram for explaining a change in the object group table.
FIG. 9 is a diagram illustrating an example of an operation performed by the user.

When it is determined that the objects 32A and 32C can be grouped, the objects 32A and 32C are grouped. FIG. 8 shows an example of the object group table in this case. In the object group table shown in FIG. 8, the object group having only the objects 32A and 32C as members is added as an object group 9.

Note that, the description is made above of the case where the position of the object 32A is changed, but the same processing is executed in a case where, for example, the object 32A is newly placed in the virtual two-dimensional plane 30 in a state in which the object 32A is not placed in the virtual two-dimensional plane 30.

FIG. 9 is a diagram for illustrating the operation performed by the user in a case of grouping the objects 32B and 32C. In the case of grouping the objects 32B and 32C, as illustrated in FIG. 9, the user moves the object 32B to the vicinity of the object 32C.

Figures 10, 11:
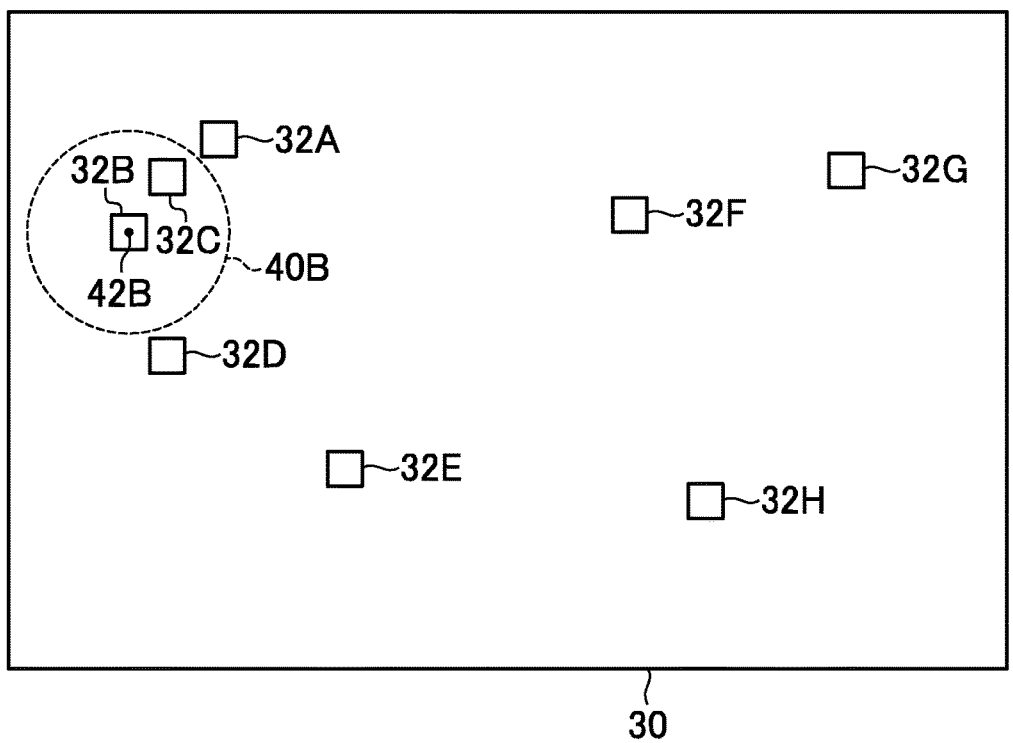
FIG. 10 is a diagram for explaining the grouping processing.
FIG. 11 is a diagram for explaining a change in the object group table.

FIG. 10 is a diagram for illustrating processing executed when the object 32B is moved as illustrated in FIG. 9. When the object 32B is moved as illustrated in FIG. 9, it is determined whether or not another object 32 exists in a determination region 40B set based on the position of the object 32B. Note that, the determination region 40B is a region within a reference distance from a representative point 42B of the object 32B.

In the case of an example illustrated in FIG. 10, the object 32C is included in the determination region 40B of the object 32B. In this case, the attribute information on the object 32B and the attribute information on the object 32C are compared with each other. Then, it is determined whether or not the objects 32B and 32C can be grouped based on a result of the above-mentioned comparison.

When it is determined that the objects 32B and 32C can be grouped, the objects 32B and 32C are grouped. FIG. 11 shows an example of the object group table in this case. In the object group table shown in FIG. 11, the object group having only the objects 32B and 32C as members is added as an object group 10.

Incidentally, as illustrated in FIG. 9, at a time point when the object 32B is moved, the object 32C already belongs to the object group 9 (see FIG. 8). In such a case, the attribute information on the object group 9 and the newly generated attribute information on the object group 10 are compared with each other. Then, it is determined whether or not the object groups 9 and 10 can be grouped based on the result of the above-mentioned comparison.

Note that, the attribute information on the object group 9 is set based on the attribute information on the object 32A and the object 32C belonging to the object group 9. For example, the attribute value of the attribute item whose attribute values are the same or similar between the attribute information on the object 32A and the attribute information on the object 32C is used as the attribute value of the object group 9. The attribute information on the object group 10 is set in the same manner.

When the similarity degree between the attribute information on the object group 9 and the attribute information on the object group 10 is equal to or higher than the reference similarity degree, it is determined that the object group 9 and 10 can be grouped. For example, when the number of attribute items whose attribute values are the same or similar is equal to or larger than the reference number of items, it is determined that the object groups 9 and 10 can be grouped.

Figures 12, 13:
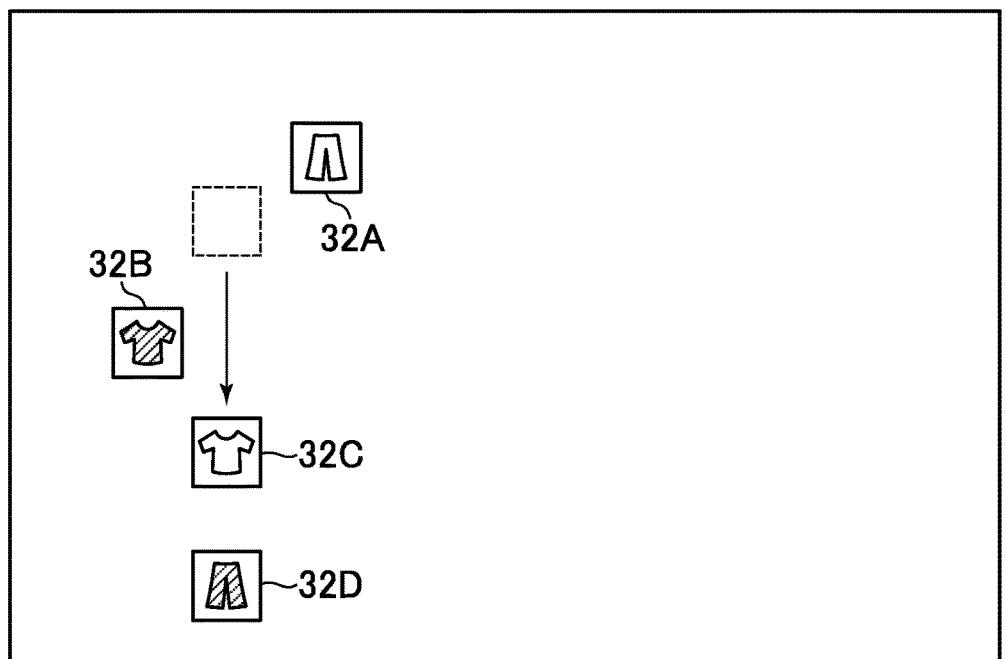
FIG. 12 is a diagram for explaining a change in the object group table.
FIG. 13 is a diagram illustrating an example of an operation performed by the user.

When it is determined that the object groups 9 and 10 can be grouped, the object groups 9 and 10 are grouped. FIG. 12 shows an example of the object group table in this case. In the object group table shown in FIG. 12, the object group having the objects 32A and 32C belonging to the object group 9 and the objects 32B and 32C belonging to the object group 10 as members is added as an object group 11.

FIG. 13 illustrates a case where the user moves the object 32C to a position below the object 32B in the state illustrated in FIG. 9. In other words, FIG. 13 illustrates a case where the object 32C included in the objects 32A and 32C belonging to the object group 9 is moved so as to be apart from the other object 32A.

Figures 14, 15:
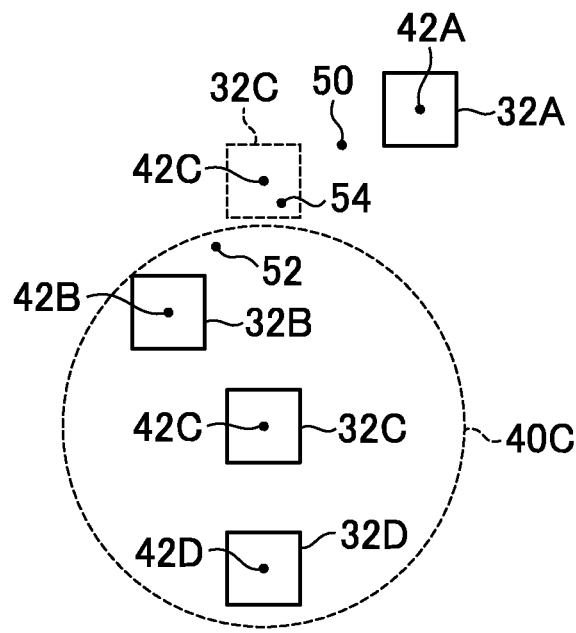
FIG. 14 is a diagram for explaining group canceling processing and the grouping processing.
FIG. 15 is a diagram for explaining a change in the object group table.

FIG. 14 is a diagram for explaining processing executed when the object 32C is moved as illustrated in FIG. 13. Note that, in FIG. 14, reference numeral 50 indicates a midpoint between the representative point 42A of the object 32A and a representative point 42C of the object 32C at the time point before the object 32C is moved. Further, reference numeral 52 indicates a midpoint between the representative points 42B and 42C of the objects 32B and 32C at the time point before the object 32C is moved. Further, reference numeral 54 indicates a center-of-gravity of the representative points 42A, 42B, and 42C of the objects 32A, 32B, and 32C at the time point before the object 32C is moved.

When the object 32C is moved as illustrated in FIG. 13, processing for canceling the grouping for the object 32C is executed. First, the object group to which the object 32C belongs is acquired. At the time point before the object 32C is moved as illustrated in FIG. 13, the object 32C belongs to the object groups 9, 10, and 11 (see FIG. 12).

In such a case, it is determined whether or not the object group 9 is included in the determination region 40C of the object 32C. As illustrated in FIG. 14, the determination region 40C of the object 32C is a region within a reference distance from the representative point 42C of the object 32C.

For example, when the representative point of the object group 9 is included in the determination region 40C of the object 32C, it is determined that the object group 9 is included in the determination region 40C of the object 32C. Note that, the object group 9 is an object group to which the objects 32A and 32C belong (see FIG. 12), and hence, for example, the midpoint 50 between the representative points 42A and 42C of the objects 32A and 32C at the time point before the object 32C is moved is used as the representative point of the object group 9.

In the case of an example illustrated in FIG. 14, the midpoint 50 is not included in the determination region 40C of the object 32C, and hence it is determined that the object group 9 is not included in the determination region 40C of the object 32C. Then, in this case, the object 32C is excluded from the object group 9. Note that, in this case, because the object 32A is the only member of the object group 9 and the object group 9 becomes the same as the object group 1, the object group 9 is deleted as shown in FIG. 15.

Further, the object 32C also belongs to the object group 10, and hence it is determined whether or not the object group 10 is included in the determination region 40C of the object 32C. That is, it is determined whether or not the representative point of the object group 10 is included in the determination region 40C of the object 32C. Note that, the object group 10 is an object group to which the objects 32B and 32C belong (see FIG. 12), and hence, for example, the midpoint 52 between the representative points 42B and 42C of the objects 32B and 32C at the time point before the object 32C is moved is used as the representative point of the object group 10.

In the case of the example illustrated in FIG. 14, the midpoint 52 is included in the determination region 40C of the object 32C, and hence it is determined that the object group 10 is included in the determination region 40C of the object 32C. In this case, the object 32C is not excluded from the object group 10, and stays as the member of the object group 10 (see FIG. 15).

In addition, the object 32C also belongs to the object group 11, and hence it is determined whether or not the object group 11 is included in the determination region 40C of the object 32C. That is, it is determined whether or not the representative point of the object group 11 is included in the determination region 40C of the object 32C. Note that, the object group 11 is an object group to which the objects 32A, 32B, and 32C belong (see FIG. 12), for example, the center-of-gravity 54 of the representative points 42A, 42B, and 42C of the objects 32A, 32B, and 32C at the time point before the object 32C is moved is used as the representative point of the object group 11.

In the case of the example illustrated in FIG. 14, the center-of-gravity 54 is not included in the determination region 40C of the object 32C, and hence it is determined that the object group 11 is not included in the determination region 40C of the object 32C. As a result, the object 32C is excluded from the object group 11. In this case, the members of the object group 11 become the objects 32A and 32B as shown in FIG. 15.

Further, when the object 32C is moved as illustrated in FIG. 13, processing for grouping the object 32C with another object 32 is also executed.

That is, it is determined whether or not another object 32 exists in the determination region 40C of the object 32C. In the case of the example illustrated in FIG. 14, the object 32D is included in the determination region 40C of the object 32C. In this case, the attribute information on the object 32C and the attribute information on the object 32D are compared with each other. Then, it is determined whether or not the objects 32C and 32D can be grouped based on the result of the above-mentioned comparison.

When it is determined that the objects 32C and 32D can be grouped, the objects 32C and 32D are grouped. That is, as shown in FIG. 15, the object group having only the objects 32C and 32D as members is added as an object group 12.

Note that, in the case of the example illustrated in FIG. 14, the object 32B is also included in the determination region 40C of the object 32C, but is ignored because the objects 32B and 32C are already grouped as the object group 10.

Figures 16, 17:
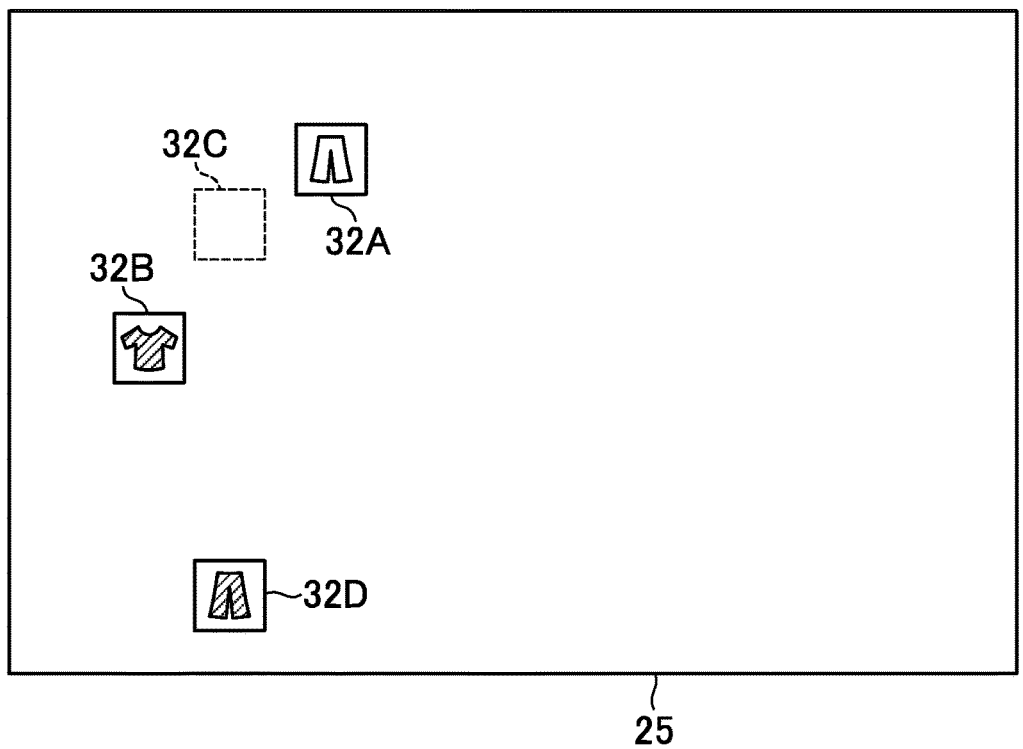
FIG. 16 is a diagram illustrating an example of an operation performed by the user.
FIG. 17 is a diagram for explaining a change in the object group table.

FIG. 16 illustrates a case where the user deletes the object 32C in the state illustrated in FIG. 9. In the case where the user deletes the object 32C, processing for excluding the object 32C from the object group is executed.

That is, first, the group to which the object 32C belongs is acquired. At the time point when the object 32C is deleted by the user, the object 32C belongs to the object groups 9, 10, and (see FIG. 12).

In this case, the object 32C is excluded from the object group 9. Note that, in this case, the object 32A is the only member of the object group 9, and the object group 9 becomes the same as the object group 1, with the result that the object group 9 is deleted as shown in FIG. 17.

Further, the object 32C is excluded from the object group 10. Note that, in this case, only the object 32B is the member of the object group 10, and the object group 10 becomes the same as the object group 2, with the result that the object group 10 is deleted as shown in FIG. 17.

In addition, the object 32C is excluded from the object group 11. In this case, as shown in FIG. 17, only the objects 32A and 32B are the members of the object group 11.

As described above, in the information processing system 1, the user can group the objects 32 by moving the object 32 (product information) displayed on the screen to the vicinity of another object 32. In the information processing system 1, it is possible for the user to group the objects 32 relatively easily without needing to pre-define a group associated with a sorting condition.

Figures 18, 19:
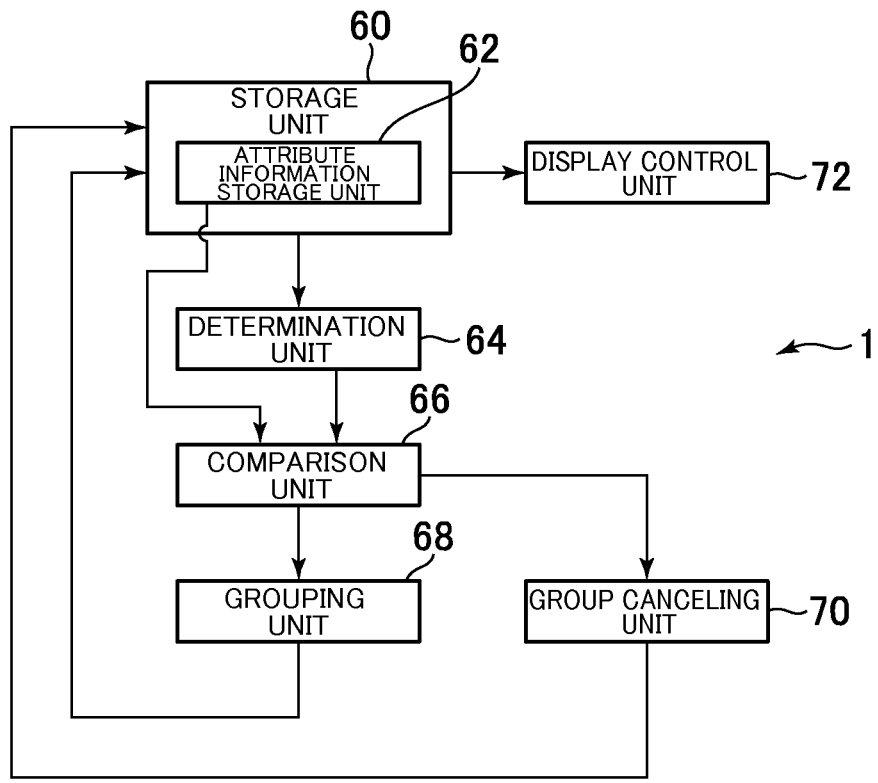
FIG. 18 is a functional block diagram of the information processing system according to the embodiment of the present invention.
FIG. 19 is a diagram showing an example of a display target region table.

A description is made of a configuration for realizing the grouping function described above. FIG. 18 is a functional block diagram illustrating functions realized in the information processing system 1. As illustrated in FIG. 18, the information processing system 1 includes a storage unit 60, a determination unit 64, a comparison unit 66, a grouping unit 68, a group canceling unit 70, and a display control unit 72. For example, the storage unit 60 is realized by the database 16 and/or the auxiliary storage unit 13. Further, for example, the functional blocks other than the storage unit 60 are realized on the server 10. That is, the control unit 11 of the server 10 executes the processing in accordance with the program, to thereby function as those functional blocks.

A description is made of the storage unit 60. The storage unit 60 stores various kinds of data. For example, the storage unit 60 stores data on the product images (objects 32).

The storage unit 60 includes an attribute information storage unit 62. The attribute information storage unit 62 stores the attribute information in association with each of the plurality of objects 32 placed in the virtual two-dimensional plane 30. That is, such an object table as shown in, for example, FIG. 4 is stored in the attribute information storage unit 62.

Further, the storage unit 60 stores information relating to the object group generated by the grouping unit 68 described later. That is, for example, such object group table as shown in FIG. 5 (FIG. 8, FIG. 11, FIG. 12, FIG. 15, or FIG. 17) is stored in the storage unit 60.

In addition, the storage unit 60 stores information relating to the display target region 34 set for each of the user terminals 20. That is, for example, such a display target region table as shown in FIG. 19 is stored in the storage unit 60. The display target region table as shown in FIG. 19 includes the user ID and display target region fields. The user ID field stores information for uniquely identifying the user (user terminal 20). The display target region field stores information for identifying the display target region 34. For example, the information indicating the representative point (for example, center point or top left vertex) of the display target region 34 is stored in the display target region field.

Descriptions are made of the determination unit 64, the comparison unit 66, and the grouping unit 68.

When a first object 32 is newly placed in the virtual two-dimensional plane 30 based on the user's operation, or when the position of the first object 32 is updated based on the user's operation, the determination unit 64 determines whether or not one of the first object 32 and a second object 32 different from the first object 32 is located within a determination region that is set based on the position of the other one of the first object 32 and the second object 32.

For example, when the object 32A is moved as illustrated in FIG. 6, the object 32A corresponds to the first object 32, and the object 32C corresponds to the second object 32.

In this case, as illustrated in FIG. 7, the determination unit 64 determines whether or not the object 32C is included in the determination region 40A of the object 32A. As described above, the determination region 40A is a region within the reference distance from the representative point 42A of the object 32A. That is, the determination region 40A is a region having a circular shape that has the representative point 42 of the object 32A as a center and has a radius of the reference distance. Note that, the determination region 40A is a region for determining whether or not another object 32 is located in the vicinity of the object 32A, and the determination region 40A may have a shape other than the circular shape.

For example, in a case where the representative point 42C of the object 32C is included in the determination region 40A of the object 32A, the determination unit 64 determines that the object 32C is included in the determination region 40A of the object 32A. Note that, the determination unit 64 may determine that the object 32C is included in the determination region 40A of the object 32A in a case where at least a part of the object 32C is included in the determination region 40A of the object 32A. Alternatively, the determination unit 64 may determine that the object 32C is included in the determination region 40A of the object 32A only in a case where the entire object 32C is included in the determination region 40A of the object 32A.

Incidentally, when the object 32A is moved as illustrated in FIG. 6, the determination unit 64 may determine whether or not the object 32A is included in the determination region that is set based on the position of the object 32C instead of determining whether or not the object 32C is included in the determination region 40A of the object 32A. As used herein, the determination region that is set based on the position of the object 32C represents, for example, a region within the reference distance from the representative point 42C of the object 32C.

The comparison unit 66 compares the attribute information associated with the first object 32 and the attribute information associated with the second object 32. For example, the comparison unit 66 compares the attribute values between the attribute information on the first object 32 and the attribute information on the second object 32 in terms of each of the plurality of attribute items.

When the determination unit 64 determines that one of the first object 32 and the second object 32 is located within the determination region that is set based on the position of the other one of the first object 32 and the second object 32, the grouping unit 68 groups the first object 32 and the second object 32 based on a result of a comparison performed by the comparison unit 66. Specifically, the grouping unit 68 determines whether or not the first object 32 and the second object 32 can be grouped based on the result of the comparison performed by the comparison unit 66.

For example, when the similarity degree between the attribute information on the first object 32 and the attribute information on the second object 32 is equal to or larger than the reference similarity degree, the grouping unit 68 determines that the first object 32 and the second object 32 can be grouped. More specifically, when the number of attribute items whose attribute values are the same or similar is equal to or larger than the reference number of items, the grouping unit 68 determines that the first object 32 and the second object 32 can be grouped. Note that, the reference number of items is set to, for example, a number of items obtained by multiplying the total number of attribute items of the comparison target by a predetermined coefficient (coefficient larger than 0 and less than 1).

When it is determined that the first object 32 and the second object 32 can be grouped, the grouping unit 68 groups the first object 32 and the second object 32. That is, the grouping unit 68 generates an object group to which the first object 32 and the second object 32 belong.

Note that, when the second object 32 already belongs to the object group, the comparison unit 66 and the grouping unit 68 execute processing described below.

That is, the comparison unit 66 compares the attribute information on the first object 32 and the attribute information on the object group to which the second object 32 belongs. Then, based on a result of this comparison, the grouping unit 68 groups the first object 32 and the above-mentioned object group.

For example, when the object 32B is moved as illustrated in FIG. 9, the object 32B corresponds to the first object 32, and the object 32C corresponds to the second object. Further, in this case, the object 32C already belongs to the object group 9 (see FIG. 8).

In such a case, the comparison unit 66 compares the attribute information on the object 32B and the attribute information on the object group 9 with each other. Here, the comparison unit 66 acquires the attribute information on the object group 9 based on the attribute information on each of the objects 32A and 32C belonging to the object group 9. For example, the comparison unit 66 uses the attribute value of the attribute items whose attribute values are the same or similar between the attribute information on the object 32A and the attribute information on the object 32C as the attribute information on the object group 9. Note that, the comparison between the attribute information on the object 32 and the attribute information on the object group is executed in the same manner as in the case where the attribute information is compared between the objects 32.

The grouping unit 68 determines whether or not the object 32B and the object group 9 can be grouped based on the result of the comparison performed by the comparison unit 66. Note that, the determination as to whether or not the object 32 and the object group can be grouped is performed in the same manner as the determination as to whether or not the objects 32 can be grouped.

When it is determined that the object 32B and the object group 9 can be grouped, the grouping unit 68 groups the object 32B and the object group 9. That is, the grouping unit 68 generates an object group to which the object 32B and the objects 32A and 32C belonging to the object group 9 belong.

A description is made of the group canceling unit 70. For example, when the object 32 belonging to the object group is removed from the virtual two-dimensional plane 30, the group canceling unit 70 removes the object 32 from the object group. For example, when the object 32C is removed from the virtual two-dimensional plane 30 as in the example illustrated in FIG. 16, the group canceling unit 70 removes the object 32C from the object group to which the object 32C belongs.

Further, for example, when the position of the object 32 belonging to the object group is changed, the group canceling unit 70 executes the processing for removing the object 32 from the object group. That is, the group canceling unit 70 determines whether or not one of the object 32 and the object group is included in the determination region that is set based on the position of the other one of the object 32 and the object group. Then, when it is determined that one of the object 32 and the object group is not included in the determination region that is set based on the position of the other one of the object 32 and the object group, the group canceling unit 70 removes the object 32 from the object group.

For example, at the time point before the object 32C is moved as illustrated in FIG. 13, the object 32C belongs to the object group 10 (see FIG. 12). When the object 32C belonging to the object group 10 is moved as illustrated in FIG. 13, the group canceling unit 70 determines whether or not the object group 10 is included in the determination region 40C of the object 32C. For example, the group canceling unit 70 determines whether or not the representative point (center-of-gravity 54) of the object group 10 is included in the determination region 40C of the object 32C. When it is determined that the object group 10 is not included in the determination region 40C of the object 32C, the group canceling unit 70 removes the object 32C from the object group 10.

A description is made of the display control unit 72. The display control unit 72 causes a screen indicating at least a part of the virtual two-dimensional plane 30 to be displayed on the display unit 25 of the user terminal 20. In the case of this embodiment, the display control unit 72 causes a screen indicating the display target region 34 of the virtual two-dimensional plane 30 to be displayed on the display unit 25 of each user terminal 20. The display target region 34 is set for each user terminal 20.

For example, the display control unit 72 generates screen data indicating the display target region 34 of the virtual two-dimensional plane 30, and transmits the screen data to the user terminal 20. Then, based on the screen data, the control unit 21 of the user terminal 20 displays the screen on the display unit 25. In this manner, the display control unit 72 causes the screen indicating the display target region 34 of the virtual two-dimensional plane 30 to be displayed on the display unit 25 of the user terminal 20.

Figure 20:
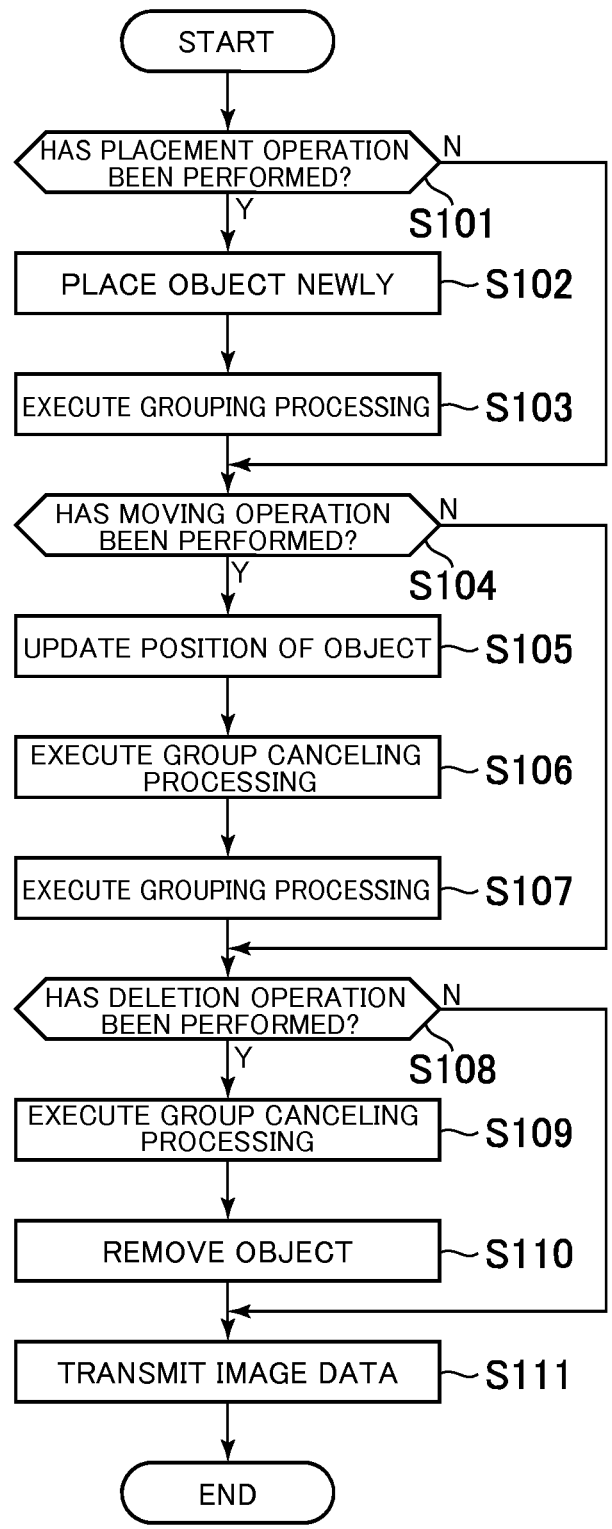
FIG. 20 is a flowchart illustrating an example of processing executed in the information processing system.

Next, a description is made of processing executed in the information processing system 1. FIG. 20 is a flowchart illustrating an example of processing repeatedly executed on the server 10. The control unit 11 of the server 10 repeatedly executes the processing illustrated in FIG. 20 in accordance with the program, to thereby function as the determination unit 64, the comparison unit 66, the grouping unit 68, the group canceling unit 70, and the display control unit 72.

As illustrated in FIG. 20, first, the control unit 11 determines whether or not a placement operation has been performed on the user terminal 20 (S101). Note that, the placement operation represents an operation for placing a new object 32 in the virtual two-dimensional plane 30.

To place a new object 32 in the virtual two-dimensional plane 30, the user designates the product image to be placed as the new object 32, a placement position of the product image, and the attribute information on the product. When those are designated, a combination of the product image, the placement position of the product image, and the attribute information on the product is transmitted from the user terminal 20 to the server 10 as placement request data. When the placement request data is received, the control unit 11 determines that the placement operation has been performed.

When it is determined that the placement operation has been performed, the control unit 11 places a new object 32 in the virtual two-dimensional plane 30 (S102). That is, the control unit 11 saves the product image designated as the new object 32 to the database 16, and additionally registers the information relating to the new object 32 in the object table.

Figure 21:
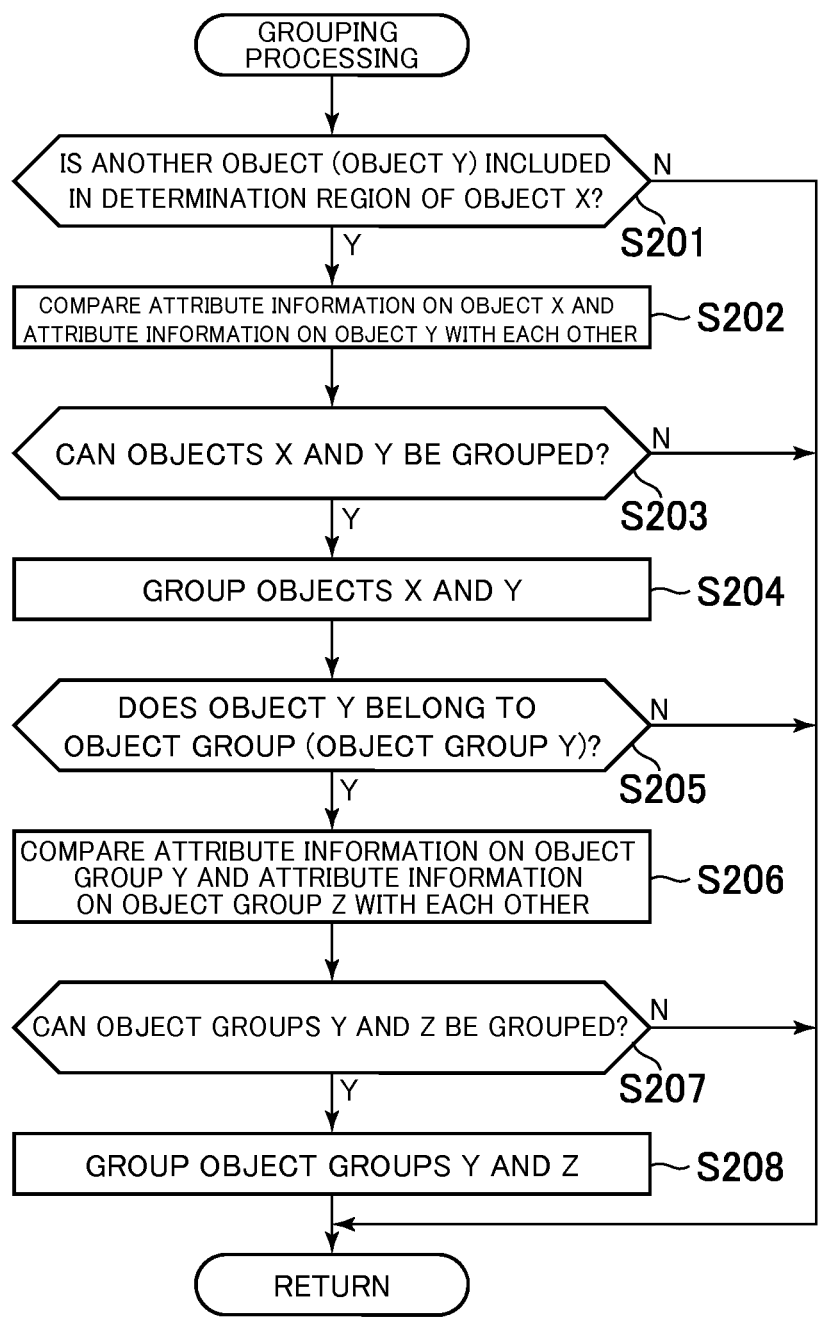
FIG. 21 is a flowchart illustrating an example of the processing executed in the information processing system.

After that, the control unit 11 sets the newly placed object 32 as an object to be processed, and executes grouping processing (S103). FIG. 21 is a flowchart illustrating an example of the grouping processing executed in Step S103.

Note that, in FIG. 21, for the sake of simplicity in description, the object 32 set as the object to be processed is referred to as object X. For example, in the case of Step S103, the newly placed object 32 corresponds to the object X.

As illustrated in FIG. 21, first, the control unit 11 (determination unit 64) determines whether or not another object 32 is included in the determination region of the object X (S201). As described above, the determination region of the object X is, for example, a region within a reference distance from the representative point of the object X. In a case where the representative point of another object 32 is included in the determination region of the object X, the control unit 11 determines that another object 32 is included in the determination region of the object X. When it is determined that another object 32 is not included in the determination region of the object X, this processing is brought to an end.

When it is determined that another object 32 is included in the determination region of the object X, the control unit 11 executes the processing of Step S202 described later. When it is determined that a plurality of objects 32 are included in the determination region of the object X, the processing of Step S202 and the subsequent steps are executed for each of those plurality of objects 32. Note that, in the following description, for the sake of simplicity in description, the another object 32 determined as being included in the determination region of the object X is referred to as object Y.

When it is determined that another object 32 (object Y) is included in the determination region of the object X, the control unit 11 (comparison unit 66) compares the attribute information on the object X and the attribute information on the object Y with each other (S202). That is, the control unit 11 compares the attribute values between the attribute information on the object X and the attribute information on the object Y in terms of each of the plurality of attribute items.

After that, the control unit 11 (grouping unit 68) determines whether or not the objects X and Y can be grouped (S203). For example, the control unit 11 acquires the number of attribute items whose attribute values are the same or similar between the attribute information on the object X and the attribute information on the object Y. Then, the control unit 11 determines whether or not the above-mentioned number of items is equal to or larger than the reference number of items. When the above-mentioned number of items is equal to or larger than the reference number of items, the control unit 11 determines that the objects X and Y can be grouped. When it is determined that the objects X and Y cannot be grouped, this processing is brought to an end.

When it is determined that the objects X and Y can be grouped, the control unit 11 (grouping unit 68) groups the objects X and Y (S204). That is, the control unit 11 additionally registers an object group having only the objects X and Y as members in the object group table, to thereby generate the object group. However, when the same object group already exists, the control unit 11 does not generate an object group. Note that, in the following description, for the sake of simplicity in description, the object group generated in Step S204 is referred to as object group Z.

After the processing of Step S204 is executed, the control unit 11 refers to the object group table to determine whether or not the object group to which the object Y belongs exists (S205). When the object group to which the object Y belongs does not exist, this processing is brought to an end.

On the other hand, when it is determined that the object group to which the object Y belongs exists, the control unit 11 executes the processing of Step S206 described later.

When it is determined that a plurality of object groups to which the object Y belongs exist, the processing of Step S206 and the subsequent steps are executed for each of those plurality of object groups. Note that, in the following description, for the sake of simplicity in description, the object group to which the object Y belongs is referred to as object group Y.

When it is determined that the object group (object group Y) to which the object Y belongs exists, the control unit 11 compares the attribute information on the object group Y and the attribute information on the object group Z with each other (S206). In this case, the control unit 11 sets the attribute information on the object group Y based on the attribute information on each of the objects 32 belonging to the object group Y. In the same manner, the control unit 11 sets the attribute information on the object group Z based on the attribute information on each of the objects 32 belonging to the object group Z. The comparison of the attribute information between the object groups is executed in the same manner as the comparison of the attribute information between the objects 32 (Step S202).

After that, the control unit 11 determines whether or not the object groups Y and Z can be grouped (S207). The determination as to whether or not the object groups can be grouped is also executed in the same manner as the determination as to whether or not the objects 32 can be grouped (Step S203). When it is determined that the object groups Y and Z cannot be grouped, this processing is brought to an end.

When it is determined that the object groups Y and Z can be grouped, the control unit 11 groups the object groups Y and Z (S208). That is, the control unit 11 additionally registers an object group having only all the objects 32 belonging to the object group Y and all the objects 32 belonging to the object group Z as members in the object group table, to thereby generate the object group. However, when the same object group already exists, the control unit 11 does not generate an object group.

As illustrated in FIG. 20, when the processing of Step S103 (that is, processing illustrated in FIG. 21) is completed, the control unit 11 determines whether or not a moving operation has been performed on the user terminal 20 (S104). Note that, the moving operation represents an operation for moving the object 32.

When the moving operation is performed on the user terminal 20, a combination of the object ID of the object 32 designated as a target to be moved (a movement target) and a moving destination position of the object 32 designated as the movement target is transmitted from the user terminal 20 to the server 10 as moving request data. When the moving request data is received, the control unit 11 determines that the moving operation has been performed.

When it is determined that the moving operation has been performed, the control unit 11 accesses the object table to update the position of the object 32 designated as the movement target (S105). After that, the control unit 11 sets, as the object to be processed, the object 32 designated as the movement target, and executes group canceling processing (S106).

Figure 22:
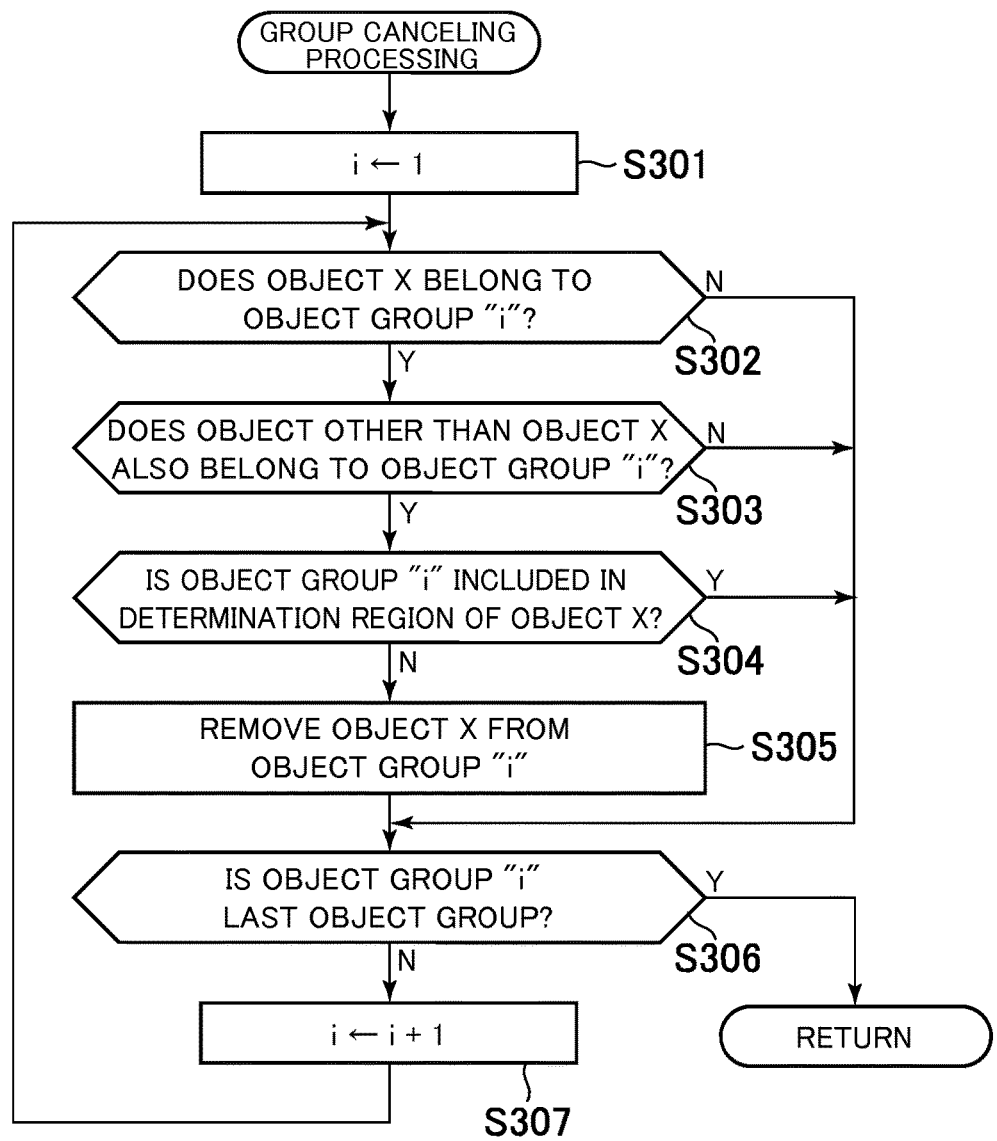
FIG. 22 is a flowchart illustrating an example of the processing executed in the information processing system.

FIG. 22 is a flowchart illustrating an example of the group canceling processing executed in Step S106. Note that, in FIG. 22, for the sake of simplicity in description, the object 32 set as the object to be processed is referred to as object X. For example, in the case of Step S106, the object 32 designated as the movement target corresponds to the object X.

As illustrated in FIG. 22, first, the control unit 11 initializes a variable i to 1 (S301). Then, the control unit 11 accesses the object group table to determine whether or not the object X belongs to the object group i (S302). When it is determined that the object X does not belong to the object group i, the control unit 11 executes the processing of Step S306 described later. Note that, when the object group i does not exist, for example, when the object group i has already been deleted, the control unit 11 recognizes that the object X does not belong to the object group i.

When it is determined that the object X belongs to the object group i, the control unit 11 determines whether or not an object 32 other than the object X also belongs to the object group i (S303). When it is determined that the object 32 other than the object X does not belong to the object group i, that is, when only the object X belongs to the object group i, the control unit 11 executes the processing of Step S306 described later.

When it is determined that the object 32 other than the object X belongs to the object group i, the control unit 11 determines whether or not the object group i is included in the determination region of the object X (S304). As described above, the determination region of the object X is the region within the reference distance from the representative point of the object X.

For example, when the representative point of the object group i is included in the determination region of the object X, the control unit 11 determines that the object group i is included in the determination region of the object X. Note that, the representative point of the object group i is, for example, the center-of-gravity (or midpoint) of the representative points of the objects 32 belonging to the object group i.

When it is determined that the object group i is included in the determination region of the object X, the control unit 11 executes the processing of Step S306 described later. On the other hand, when it is determined that the object group i is not included in the determination region of the object X, the control unit 11 removes the object X from the object group i (S305).

Note that, when the object X is removed from the object group i, the control unit 11 refers to the object group table to confirm whether or not there exists an object group that is the same as the object group i from which the object X has been removed. When the object group that is the same as the object group i from which the object X has been removed exists, the control unit 11 deletes the object group i from the object group table.

After the processing of Step S305 is executed, the control unit 11 determines whether or not the object group i is the last object group among the object groups registered in the object group table (S306). When it is determined that the object group i is not the last object group, the control unit 11 adds 1 to the variable i (S307), and executes the processing of Step S302 again. On the other hand, when it is determined that the object group i is the last object group, this processing is brought to an end.

As illustrated in FIG. 20, after the processing of Step S106 (that is, processing illustrated in FIG. 22) is executed, the control unit 11 sets, as the object to be processed, the object 32 designated as the movement target, and executes the grouping processing (S107). The grouping processing executed in Step S107 is the same as the grouping processing executed in Step S103 (FIG. 21). However, in this case, the object 32 designated as the movement target corresponds to the object X illustrated in FIG. 21.

After the processing of Step S107 (that is, processing illustrated in FIG. 21) is executed, the control unit 11 determines whether or not a deletion operation has been performed on the user terminal 20 (S108). Note that, the deletion operation represents an operation for deleting the object 32.

When the deletion operation is performed on the user terminal 20, the object ID of the object 32 designated as a target to be deleted (a deletion target) is transmitted from the user terminal 20 to the server 10 as deletion request data. When the deletion request data is received, the control unit 11 determines that the deletion operation has been performed. When it is determined that the deletion operation has not been performed, the control unit 11 executes the processing of Step S111 described later.

Figure 23:
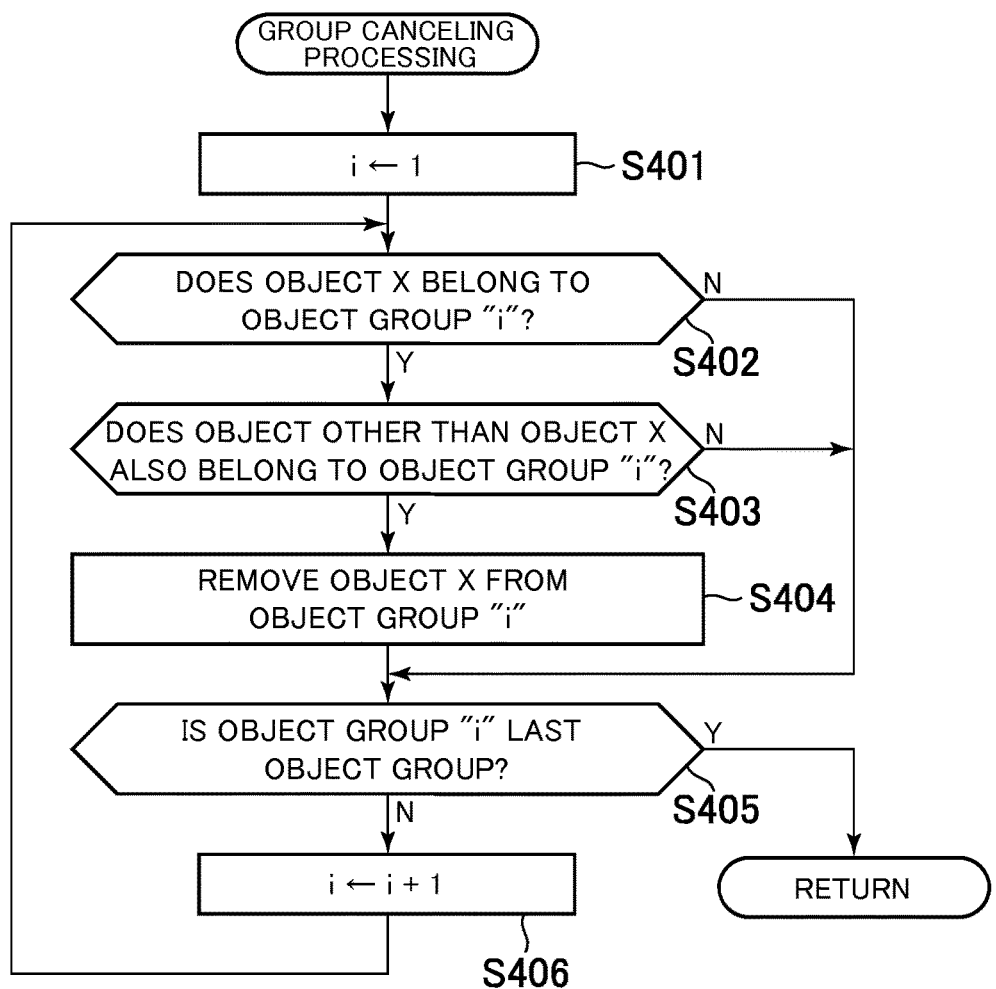
FIG. 23 is a flowchart illustrating an example of the processing executed in the information processing system.

When it is determined that the deletion operation has been performed, the control unit 11 sets, as an object to be processed, the object 32 designated as the deletion target, and executes the group canceling processing (S109). FIG. 23 is a flowchart illustrating an example of the group canceling processing executed in Step S109. In FIG. 23, for the sake of simplicity in description, the object 32 set as the object to be processed is referred to as object X. For example, in the case of Step S109, the object 32 designated as the deletion target corresponds to the object X.

Note that, Steps S401 to S403 illustrated in FIG. 23 are the same as Steps S301 to S303 illustrated in FIG. 22, respectively. Further, Steps S404 to S406 illustrated in FIG. 23 are the same as Steps S305 to S307 illustrated in FIG. 22, respectively. Therefore, descriptions thereof are omitted here.

As illustrated in FIG. 20, after the processing of Step S109 (that is, processing illustrated in FIG. 23) is executed, the control unit 11 removes the object 32 designated as the deletion target from the virtual two-dimensional plane 30 (S110). That is, the control unit 11 deletes the object 32 designated as the deletion target from the object table.

After that, the control unit 11 (display control unit 72) generates screen data for each user terminal 20, and transmits the screen data to the user terminal 20 (S111). The processing illustrated in FIG. 20 has been described above.

According to the information processing system 1 described above, the user can group the objects 32 by moving the object 32 displayed on the screen to the vicinity of another object 32. In the information processing system 1, it is possible to group the objects 32 without needing to pre-define the group associated with a sorting condition.

Figure 24:
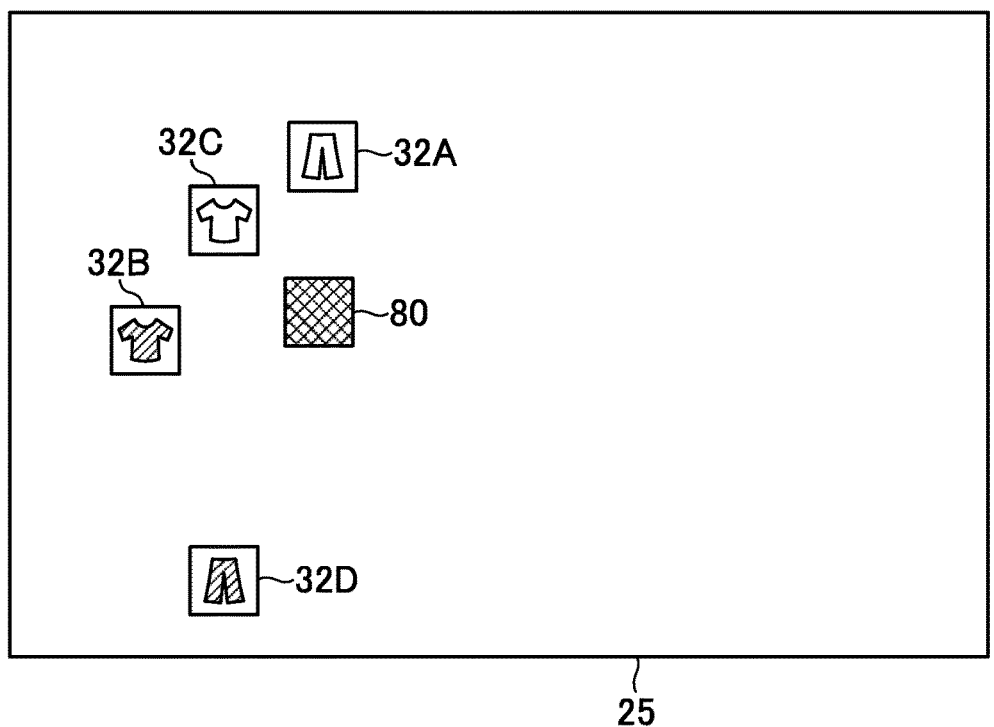
FIG. 24 is a diagram for explaining a case where an object group is used for an advertisement.

Note that, the object group generated as described above can be used for, for example, an advertisement. FIG. 24 is a diagram for explaining a case where the object group is used for an advertisement. FIG. 24 illustrates an example of the screen displayed on the display unit 25 of the user terminal 20. Note that, it is assumed in FIG. 24 that the objects 32A, 32B, and 32C belong to the object group.

On the screen illustrated in FIG. 24, an advertisement 80 is displayed. The advertisement 80 is an advertisement relating to the object group to which the objects 32A, 32B, and 32C belong, and the display position of the advertisement 80 is set based on the representative point of the object group.

Note that, such a screen as illustrated in FIG. 24 can be generated by placing the advertisement 80 (advertisement object) in the position set based on the representative point of the object group within the virtual two-dimensional plane 30. Alternatively, such a screen as illustrated in FIG. 24 can be generated by overwriting/drawing the advertisement 80 (advertisement image) in the display position corresponding to the representative point of the object group within the screen indicating the display target region 34 of the virtual two-dimensional plane 30.

Incidentally, as described above, in the information processing system 1, the screen indicating the display target region 34 of the virtual two-dimensional plane 30 is displayed on the display unit 25 of each of the plurality of user terminals 20. Further, the display target region 34 can be set for each user terminal 20 (user). Therefore, the position of the advertisement 80 may be set based on the display target region 34 corresponding to each user terminal 20.

Figure 25:
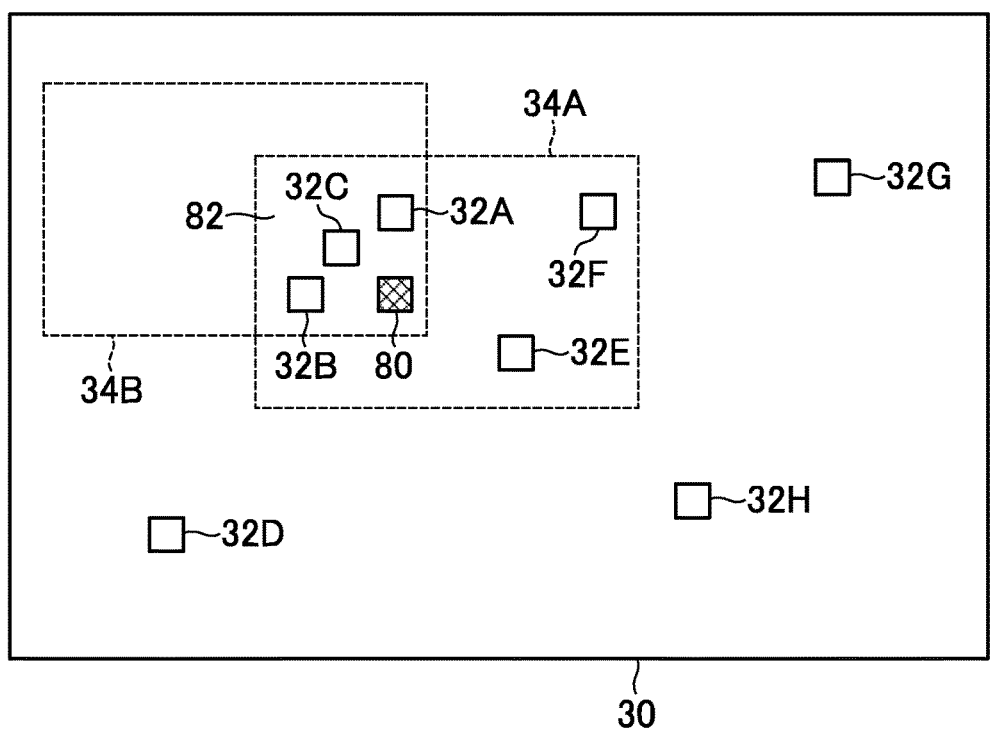
FIG. 25 is a diagram for explaining a method of setting a position of the advertisement.

FIG. 25 is a diagram for explaining a method of setting the position of the advertisement 80. Note that, in FIG. 25, a display target region 34A is the display target region 34 corresponding to the first user terminal 20, and a display target region 34B is the display target region 34 corresponding to the second user terminal 20. Also in FIG. 25, the objects 32A, 32B, and 32C belong to the object group.

In the case of an example illustrated in FIG. 25, the objects 32A, 32B, and 32C belonging to the object group are included in both the display target regions 34A and 34B. In other words, the objects 32A, 32B, and 32C belonging to the object group are included in an overlapping region 82 between the display target regions 34A and 34B.

In such a case, the advertisement 80 (advertisement object) corresponding to the object group is placed in the overlapping region 82. With this configuration, the advertisement 80 corresponding to the object group is displayed on the display units 25 of both the first user terminal 20 and the second user terminal 20, and as a result, the advertisement is effectively performed.

Note that, the present invention is not limited to the embodiment described above.

[1] For example, the processing executed when the object 32B is moved as illustrated in FIG. 9 is not limited to the example described above. Two other examples of the processing executed when the object 32B is moved as illustrated in FIG. 9 are described below with reference to FIG. 10.

[1-1] First, the first example is described. When the object 32B is moved as illustrated in FIG. 9, the determination unit 64 determines whether or not another object 32 exists in the determination region 40B of the object 32B. As illustrated in FIG. 10, the object 32C is included in the determination region 40B of the object 32B.

When the object 32C is included in the determination region 40B of the object 32B, it is determined whether or not the object group to which the object 32C belongs exists. The object 32C belongs to the object group 9 at this time point (see FIG. 8), and hence the comparison unit 66 compares the attribute information on the object 32B and the attribute information on the object group 9 with each other. Note that, the comparison of the attribute information between the object 32 and the object group is executed in the same manner as the comparison of the attribute information between the objects 32 (Step S202) and between the object groups (Step S206).

Then, the grouping unit 68 determines whether or not the object 32B and the object group 9 can be grouped based on the result of the above-mentioned comparison. Note that, the determination as to whether or not the object 32 and the object group can be grouped is also executed in the same manner as the determination as to whether or not the objects 32 can be grouped (Step S203) and the determination as to whether or not the object groups can be grouped (Step S207).

When it is determined that the object 32B and the object group 9 can be grouped, the grouping unit 68 groups the object 32B and the object group 9. FIG. 26 shows an example of the object group table in this case. In the object group table shown in FIG. 26, the object group having the object 32B and the objects 32A and 32C belonging to the object group 9 as the members is added as the object group 10.

Figure 27:
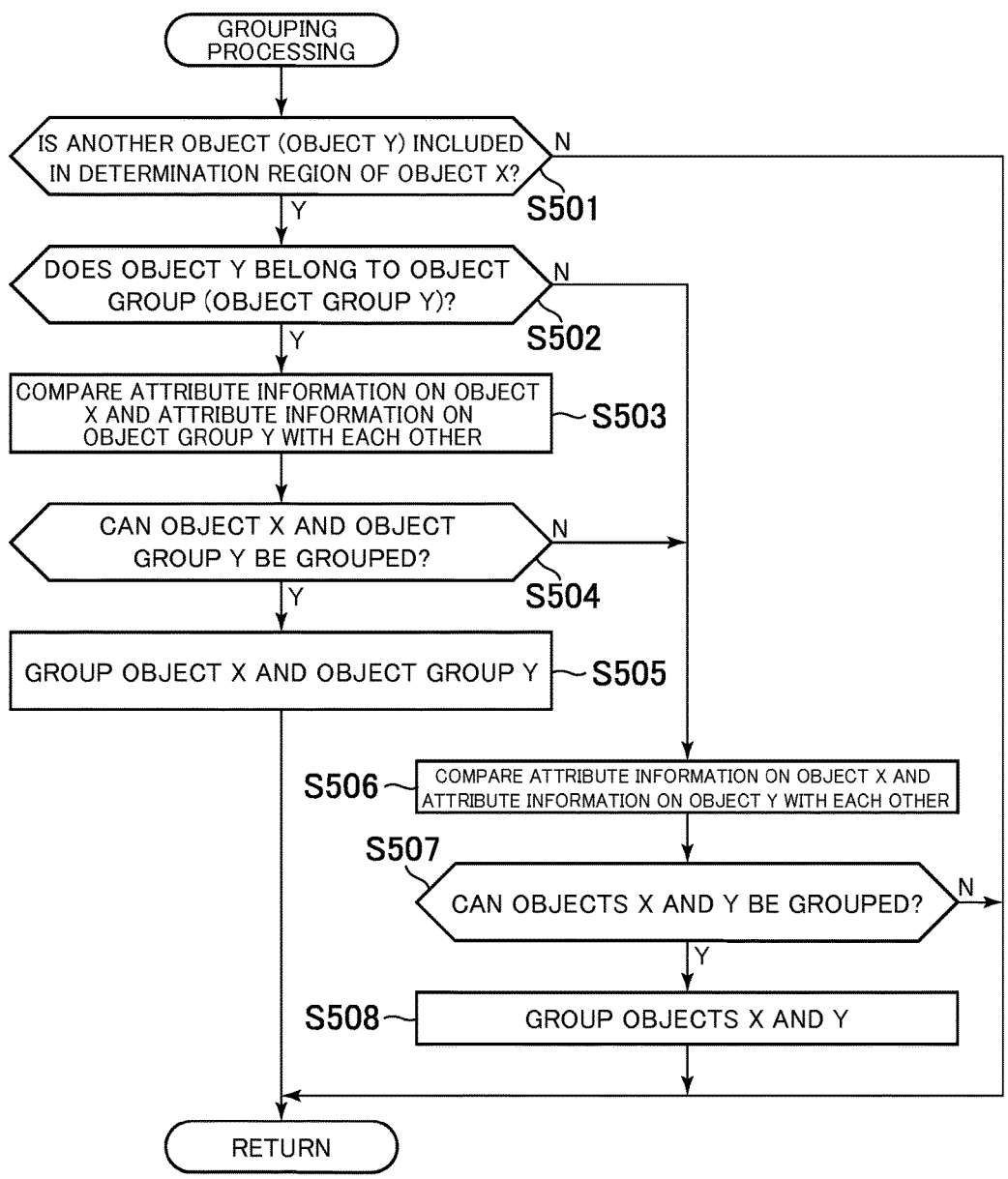
FIG. 27 is a flowchart illustrating another example of the processing executed in the information processing system.

In order to realize the above-mentioned operations of the determination unit 64, the comparison unit 66, and the grouping unit 68, grouping processing illustrated in FIG. 27 may be executed instead of the grouping processing illustrated in FIG. 21. The grouping processing illustrated in FIG. 27 is described below.

In the grouping processing illustrated in FIG. 27, first, the control unit 11 (determination unit 64) determines whether or not another object 32 are included in the determination region of the object X (S501). The processing of Step S501 is the same as Step S201 of FIG. 21. When it is determined that another object 32 is not included in the determination region of the object X, this processing is brought to an end.

When it is determined that another object 32 is included in the determination region of the object X, the control unit 11 executes the processing of Step S502. When it is determined that the plurality of objects 32 are included in the determination region of the object X, the processing of Step S502 and the subsequent steps are executed for each of those plurality of objects 32. Note that, in the following description, for the sake of simplicity in description, the another object 32 determined as being included in the determination region of the object X is referred to as object Y.

In Step S502, the control unit 11 refers to the object group table to determine whether or not the object group to which the object Y belongs exists. The processing of Step S502 is the same as Step S205 of FIG. 21.

When it is determined that the object group to which the object Y belongs exists, the control unit 11 executes the processing of Step S503. When it is determined that there exist a plurality of object groups to which the object Y belongs, the processing of Step S503 and the subsequent steps are executed for each of those plurality of object groups. Note that, in the following description, for the sake of simplicity in description, the object group to which the object Y belongs is referred to as object group Y.

In Step S503, the control unit 11 (comparison unit 66) compares the attribute information on the object X and the attribute information on the object group Y with each other. That is, the control unit 11 compares the attribute values between the attribute information on the object X and the attribute information on the object group Y in terms of each of the plurality of attribute items.

After that, the control unit 11 (grouping unit 68) determines whether or not the object X and the object group Y can be grouped (S504). For example, the control unit 11 acquires the number of attribute items whose attribute values are the same or similar between the attribute information on the object X and the attribute information on the object group Y. When the above-mentioned number of items is equal to or larger than the reference number of items, the control unit 11 determines that the object X and the object group Y can be grouped.

When it is determined that the object X and the object group Y can be grouped, the control unit 11 groups the object X and the object group Y (S505). That is, the control unit 11 additionally registers an object group having the object X and all the objects 32 that belong to the object group Y as members in the object group table, to thereby generate the object group. However, when the same object group already exists, the control unit 11 does not generate an object group.

On the other hand, when it is determined in Step S502 that the object group to which the object Y belongs does not exist, or when it is determined in Step S504 that the object X and the object group Y cannot be grouped, the control unit 11 executes the processing of Steps S506 to S508. The processing of those Steps S506 to S508 is the same as the processing of Steps S202 to S204 illustrated in FIG. 21. Therefore, descriptions thereof are omitted here.

Note that, in the processing illustrated in FIG. 27 described above, it may be determined whether or not the object group is included in the determination region of the object X instead of executing the processing of Steps S501 and S502. When the object group is included in the determination region of the object X, the processing of Steps S503 to S505 may be executed with the object group as object group Y.

[1-2] Next, the second example is described. When the object 32B is moved as illustrated in FIG. 9, the determination unit 64 determines whether or not another object 32 exists in the determination region 40B of the object 32B. As illustrated in FIG. 10, the object 32C is included in the determination region 40B of the object 32B.

When the object 32C is included in the determination region 40B of the object 32B, the comparison unit 66 compares the attribute information on the object 32B and the attribute information on the object 32C with each other. Then, the grouping unit 68 determines whether or not the objects 32B and 32C can be grouped based on the result of the above-mentioned comparison. When it is determined that the objects 32B and 32C can be grouped, the grouping unit 68 groups the objects 32B and 32C. The object group table in this case is as shown in FIG. 11.

Note that, in this case, the object 32C already belongs to the object group 9. Therefore, in addition, the comparison unit 66 compares the attribute information on the object 32B and the attribute information on the object group 9 with each other. Then, the grouping unit 68 determines whether or not the object 32B and the object group 9 can be grouped based on the result of the above-mentioned comparison.

When it is determined that the object 32B and the object group 9 can be grouped, the grouping unit 68 groups the object 32B and the object group 9. The object group table in this case is as shown in FIG. 12.

Figure 28:
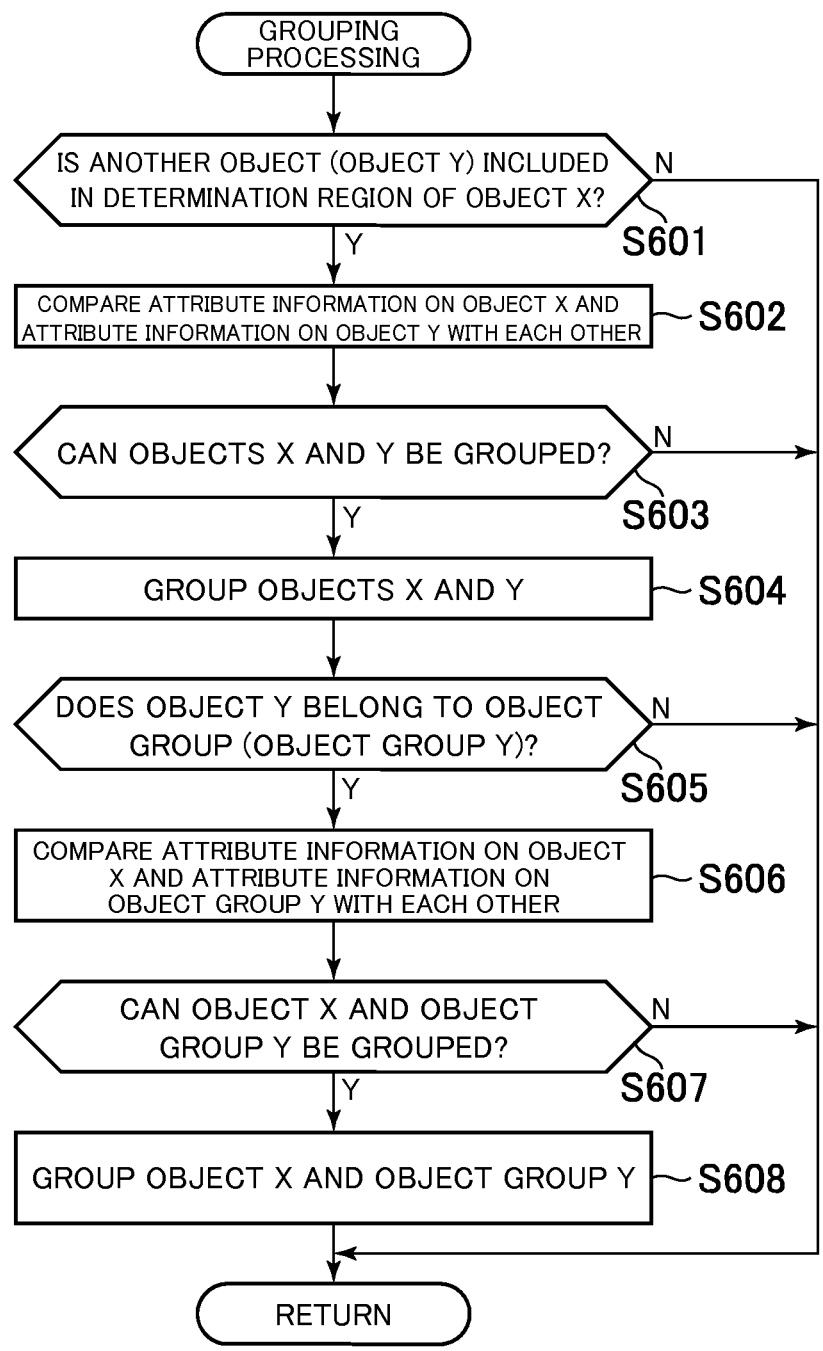
FIG. 28 is a flowchart illustrating another example of the processing executed in the information processing system.

In order to realize the above-mentioned operations of the determination unit 64, the comparison unit 66, and the grouping unit 68, grouping processing illustrated in FIG. 28 may be executed instead of the grouping processing illustrated in FIG. 21.

Note that, the processing of Steps S601 to S604 illustrated in FIG. 28 is the same as the processing of Steps S201 to S204 illustrated in FIG. 21. Further, the processing of Steps S605 to S608 illustrated in FIG. 28 is the same as the processing of Steps S502 to S505 illustrated in FIG. 27. Therefore, descriptions thereof are omitted here.

[2] An area of the above-mentioned determination region (determination regions 40A, 40B, and 40C) may be changed based on the number of the objects 32 placed in the virtual two-dimensional plane 30. For example, the determination region may be set narrower as the number of the objects 32 placed in the virtual two-dimensional plane 30 becomes larger. In other words, the determination region may be set wider as the number of the objects 32 placed in the virtual two-dimensional plane 30 becomes smaller.

In order to change the area of the determination region based on the number of the objects 32 placed in the virtual two-dimensional plane 30, it is necessary to provide correspondence information relating to a correspondence between the number of the objects 32 and information relating to the area of the determination region.

FIG. 29 shows an example of the correspondence information. In the correspondence information illustrated in FIG. 29, the correspondence between a number (n) of the objects 32 and a reference distance (r) is defined. In FIG. 29, N1 and N2 each indicate a predetermined number, and those values have a relationship of N1<N2. Further, R1, R2, and R3 each indicate a predetermined distance, and those values have a relationship of R1>R2>R3. The correspondence information illustrated in FIG. 29 is set so that the reference distance (r) becomes shorter as the number (n) of the objects 32 becomes larger. Note that, the correspondence information may be information having a formula format.

Here, the case where the object 32A is moved as illustrated in FIG. 6 is assumed. In this case, the control unit 11 acquires the reference distance (r) based on the above-mentioned correspondence information and the number of the objects 32 placed in the virtual two-dimensional plane 30. Then, the control unit 11 sets a region within the reference distance (r) from the object 32A as the determination region 40A of the object 32A.

When the number of the objects 32 placed in the virtual two-dimensional plane 30 is large, another object 32 is easily included in the determination region of the object 32. In such a state, for example, even in a case where the user does not intend to group an object 32 (here referred to as object P) and another object 32 (here referred to as object Q), when the user moves the object P, the object Q may be included in the determination region of the object P, with the result that the objects P and Q may be grouped. In such a case, the objects 32 that are not intended to be grouped by the user may be grouped, which may cause the user to feel stressed. In this respect, with the above-mentioned configuration, the area of the determination region of the object 32 is controlled based on the number of the objects 32 placed in the virtual two-dimensional plane 30, and hence it is possible to reduce an occurrence of the above-mentioned inconvenience.

[3] For example, the area of the above-mentioned determination region (determination region 40A, 40B, or 40C) may be changed based on a density of the objects 32. Specifically, the area of the determination region of one object 32 may be changed based on the density of other objects 32 placed in the vicinity of the one object 32. For example, the determination region may be set narrower as the density of the objects 32 becomes higher. In other words, the determination region may be set wider as the density of the objects 32 becomes lower.

In a case of changing the area of the determination region of the object 32 based on the density of the objects 32 placed in the vicinity of the object 32, it is necessary to provide information relating to a correspondence between information relating to the density of the objects 32 and the information relating to the area of the determination region. The correspondence information is, for example, the same information as the correspondence information illustrated in FIG. 29. However, in this case, the number (n) of objects 32 means the number of the objects 32 placed in the vicinity of the object 32. Note that, also in this case, the correspondence information may be the information having a formula format.

Here, the case where the object 32A is moved as illustrated in FIG. 6 is assumed. In this case, the control unit 11 acquires the number (n) of the objects 32 placed in the vicinity of the object 32A. The vicinity of the object 32A may be set as, for example, a region within a predetermined distance from the representative point 42A of the object 32A. Then, the control unit 11 acquires the reference distance (r) based on the above-mentioned correspondence information and the above-mentioned number (n), and sets a region within the reference distance (r) from the representative point 42A of the object 32A as the determination region 40A of the object 32A.

Note that, it is also possible to change the area of the above-mentioned determination region without using the above-mentioned correspondence information.

Here, in the same manner, the case where the object 32A is moved as illustrated in FIG. 6 is assumed. In this case, the control unit 11 acquires the number of other objects 32 included in the determination region 40A of the object 32A. When the number of other objects 32 included in the determination region 40A of the object 32A is equal to or larger than a threshold value, the control unit 11 narrows the determination region 40A of the object 32A.

For example, the control unit 11 narrows the determination region 40A of the object 32A by setting a distance (R*k) obtained by multiplying the current reference distance (R) by a predetermined coefficient k (0<k<1) as a new reference distance (R). In this manner, the control unit 11 may keep narrowing the determination region 40A of the object 32A until the number of other objects 32 included in the determination region 40A of the object 32A becomes less than the threshold value.

When other objects 32 are dense in the vicinity of the object 32, another object 32 is easily included in the determination region of the object 32. In such a state, for example, even in the case where the user does not intend to group the object 32 (here referred to as object P) and another object 32 (here referred to as object Q), the object Q may be included in the determination region of the object P, with the result that the objects P and Q may be grouped. In such a case, the objects 32 that are not intended to be grouped by the user may be grouped, which may cause the user to feel stressed. In this respect, with the above-mentioned configuration, the area of the determination region is controlled based on the density of the objects 32, and hence it is possible to reduce the occurrence of the above-mentioned inconvenience.

Note that, the modified example [3] described above may be combined with the modified example [2] described earlier. That is, in a case of setting the area of the determination region 40A of the object 32A, the area of the determination region 40A of the object 32A may also be set based on both the number of the objects 32 placed in the virtual two-dimensional plane 30 and the density of the objects 32 placed in the vicinity of the object 32A.

More specifically, the area of the determination region 40A of the object 32A may be set based on the information relating to a correspondence between the information relating to the area of the determination region and a combination of the information relating to the number of the objects 32 placed in the virtual two-dimensional plane 30 and the information relating to the density of the objects 32.

Alternatively, the area of the determination region 40A of the object 32A when the number of the objects 32 arranged in the virtual two-dimensional plane 30 is large is set narrower than the area of the determination region 40A of the object 32A when the number of the objects 32 arranged in the virtual two-dimensional plane 30 is small, and the area of the determination region 42A may be set further narrower when the number of the objects 32 placed in the vicinity of the object 32A is equal to or larger than the threshold value.

[4] The attribute item to be used for the comparison of the attribute information between the objects 32 may be changed based on the categories associated with those objects 32.

In order to change the attribute item to be used for the comparison of the attribute information between the objects 32 based on the categories associated with those objects 32, it is necessary to provide comparison target item data in which a category condition relating to the category and the information relating to the attribute item to be used for the comparison are associated with each other. FIG. 30 shows an example of the comparison target item data.

In a case of comparing the attribute information on the first object 32 and the attribute information on the second object 32 with each other, first, the comparison unit 66 determines whether or not the category associated with the first object 32 and the category associated with the second object 32 are the same or similar. When the category associated with the first object 32 and the category associated with the second object 32 are the same or similar, the comparison unit 66 refers to the above-mentioned comparison target item data to acquire the attribute item corresponding to the category condition satisfied by the categories of the first object 32 and the second object 32. Then, the comparison unit 66 uses the attribute item as the comparison target to compare the attribute information on the first object 32 and the attribute information on the second object 32 with each other.

With such an operation, the attribute item of the comparison target can be changed based on the category associated with the first object 32 and the category associated with the second object 32. That is, only the attribute item suitable for the category associated with the first object 32 and the category associated with the second object 32 can be used as the comparison target.

[5] In a case of comparing the attribute information by comparing the price, it may be determined that the prices are similar when a difference in the present price is equal to or smaller than a threshold value. Further, in this case, the threshold value may be changed depending on the category of the product. For example, the threshold value may be set to a relatively high value in a case of the category to which an expensive product belongs, while the threshold value may be set to a relatively low value in a case of the category to which a low-price product belongs.

Further, for example, a price (discount price) obtained by subtracting the present price from the base price (regular price), or a numerical value (discount rate) obtained by dividing the present price by the base price (regular price) may be compared. Then, it may be determined that the prices are similar when a difference in the discount price or the discount rate is equal to or smaller than the threshold value. By performing such a comparison, for example, the product whose discount price or discount rate is high (that is, bargain product) can be grouped.

[6] When the first object 32 moves toward the second object 32, a moving mode of the first object 32 may be changed based on the similarity degree between the attribute information on the first object 32 and the attribute information on the second object 32. For example, when the similarity degree is higher than the reference similarity degree, the first object 32 may be moved in such a manner that the first object 32 is attracted to the second object 32. Further, for example, when the similarity degree is lower than the reference similarity degree, the first object 32 may be moved in such a manner that a force is applied thereto in a direction reverse to a direction from the first object 32 toward the second object 32.

[7] The entire virtual two-dimensional plane 30 may be displayed on the display unit 25 of the user terminal 20.

[8] The objects 32 may be placed in a virtual three-dimensional space instead of the virtual two-dimensional plane 30. Then, a screen indicating the virtual three-dimensional space viewed from a viewing point set in the virtual three-dimensional space may be displayed on the display unit 25 of the user terminal 20. Note that, in this case, the viewing point may be set for each user terminal 20 (user). Further, in this case, a viewing field of the viewing point corresponds to the display target region.

[9] The example in which the product image corresponds to the object 32 is described above, but the object 32 may correspond to an object other than the product image. For example, a cooked food image may correspond to the object 32. Note that, in this case, for example, a food material or a cooking time corresponds to the attribute information. Further, for example, an icon image indicating a file or a folder may correspond to the object 32. Note that, in this case, a name, a size, a creation date/time, an update date/time, or the like of the file or the folder corresponds to the attribute information.

[10] The example of using the object group for the advertisement is described above, but the object group may be used for a purpose other than the advertisement.

[11] Any one of the plurality of user terminals 20 may serve as the server 10. That is, the processing described as being executed by the control unit 11 of the server 10 may be executed by the control unit 21 of the user terminal 20 serving as the server 10. In this case, the determination unit 64, the comparison unit 66, the grouping unit 68, the group canceling unit 70, and the display control unit 72 are realized on the user terminal 20 serving as the server 10.

[12] Further, the present invention can be applied to the information processing system 1 formed of one user terminal 20 (information processing device). That is, the present invention can be applied to a case where the user solely groups the objects 32. In this case, the processing described as being executed by the control unit 11 of the server 10 is executed by the control unit 21 of the user terminal 20. Moreover, the determination unit 64, the comparison unit 66, the grouping unit 68, the group canceling unit 70, and the display control unit 72 are realized on the user terminal 20 serving as the server 10.

REFERENCE SIGNS LIST

1 information processing system, 2 communication network, 10 server, 11, 21 control unit, 12, 22 main memory unit, 13, 23 auxiliary storage unit, 14, 24 communication unit, 15 optical disc drive unit, 20 user terminal, 25 display unit, 26 audio output unit, 27 operation unit, 30 virtual two-dimensional plane, 32A, 32B, 32C, 32D, 32E, 32F, 32G, 32H object, 34, 34A, 34B display target region, 40A, 40B, 40C determination region, 42A, 42B, 42C, 42D representative point, 50, 52 midpoint, 54 center-of-gravity, 60 storage unit, 62 attribute information storage unit, 64 determination unit, 66 comparison unit, 68 grouping unit, 70 group canceling unit, 72 display control unit, 80 advertisement, 82 overlapping region

The invention claimed is:

1. An information processing system, comprising:
at least one hardware processor; and
at least one hardware memory device that stores a plurality of instructions, which when executed by the at least one hardware processor, causes the at least one hardware processor to:
determine whether or not a position within a virtual two-dimensional plane or a virtual three-dimensional space, where one of a first object and a second object is placed, is included in a determination region within the virtual two-dimensional plane or the virtual three-dimensional space that is set based on a position within the virtual two-dimensional plane or the virtual three-dimensional space where another one of the first object and the second object is placed, in a case where the first object is newly placed in the virtual two-dimensional plane or the virtual three-dimensional space based on a user's operation or in a case where the position of the first object is updated based on the user's operation;
obtain a similarity degree between attribute information associated with the first object and attribute information associated with the second object, and determine whether the similarity degree is higher than a threshold;
group the first object and the second object in a case where it is determined that the position within the virtual two-dimensional plane or the virtual three-dimensional space, where the one of the first object and the second object is placed, is included in the determination region that is set within the virtual two-dimensional plane or the virtual three-dimensional space and it is determined that the similarity degree is higher than the threshold;
display a screen indicating a display target region of the virtual two-dimensional plane or the virtual three-dimensional space on each of a plurality of displays, the display target region being set in different positions for each of the plurality of displays; and
place an advertisement object corresponding to the object group generated in an overlapping region of a plurality of display target regions respectively corresponding to the plurality of displays in a case where the object group is included in the overlapping region.

2. The information processing system according to claim 1, wherein:
the attribute information comprises:
information relating to a category; and
information relating to an attribute item other than the category;
based on comparison target item data in which a category condition relating to the category is associated with the attribute item other than the category to be used as a comparison target, the at least one hardware processor obtains the similarity degree between the attribute information associated with the first object and the attribute information associated with the second object in terms of the attribute item associated with the category condition satisfied by the category associated with the first object and the category associated with the second object.

3. The information processing system according to claim 1, wherein the at least one hardware processor further:
controls an area of the determination region based on a number of objects placed in the virtual two-dimensional plane or the virtual three-dimensional space.

4. The information processing system according to claim 1, wherein the at least one hardware processor further:
controls an area of the determination region based on a density of the plurality of objects in the virtual two-dimensional plane or the virtual three-dimensional space.

5. The information processing system according to claim 1, wherein the at least one hardware processor further:
groups objects belonging to a first object group and objects belonging to a second object group based on a result of a comparison between the attribute information corresponding to the first object group and the attribute information corresponding to the second object group in a case where the first object group obtained by grouping the first object and the second object is generated in a state in which the second object already belongs to the second object group.

6. The information processing system according to claim 1, wherein the at least one hardware processor further:
groups the first object and objects belonging to an object group based on a result of a comparison between the attribute information associated with the first object and the attribute information corresponding to the object group in the case where it is determined that the position of the one of the first object and the second object is included in the determination region in a state in which the second object already belongs to the object group.

7. The information processing system according to claim 1, wherein the at least one hardware processor further:
determines whether or not one of the first object and an object group is included in a determination region that is set based on the position of another one of the first object and the object group in the case where the first object is newly placed in the virtual two-dimensional plane or the virtual three-dimensional space, or in the case where the position of the first object is updated, in a state in which the object group already exists; and
groups the first object and objects belonging to the object group based on a result of a comparison between the attribute information associated with the first object and the attribute information corresponding to the object group in a case where it is determined that the one of the first object and the object group is included in the determination region.

8. The information processing system according to claim 1, wherein the at least one hardware processor further:
removes an object from an object group to which the object belongs in a case where the object is removed from the virtual two-dimensional plane or the virtual three-dimensional space based on the user's operation.

9. The information processing system according to claim 1, wherein the at least one hardware processor further:
determines whether or not one of an object and an object group to which the object belongs is included in a determination region that is set based on the position of another one of the object and the object group in a case where the position of the object placed in the virtual two-dimensional plane or the virtual three-dimensional space is changed based on the user's operation; and
removes the object from the object group in a case where it is determined that the one of the object and the object group is not included in the determination region.

10. A method of controlling an information processing system, the method comprising:
determining whether or not a position within a virtual two-dimensional plane or a virtual three-dimensional space, where one of a first object and a second object is placed, is included in a determination region within the virtual two-dimensional plane or the virtual three-dimensional space that is set based on a position within the virtual two-dimensional plane or the virtual three-dimensional space where another one of the first object and the second object is placed, in a case where the first object is newly placed in the virtual two-dimensional plane or the virtual three-dimensional space based on a user's operation or in a case where the position of the first object is updated based on the user's operation;
obtaining a similarity degree between attribute information associated with the first object and attribute information associated with the second object, and determining whether the similarity degree is higher than a threshold;
grouping the first object and the second object in a case where it is determined that the position within the virtual two-dimensional plane or the virtual three-dimensional space, where the one of the first object and the second object is placed, is included in the determination region that is set within the virtual two-dimensional plane or the virtual three-dimensional space and it is determined that the similarity degree is higher than the threshold;
displaying a screen indicating a display target region of the virtual two-dimensional plane or the virtual three-dimensional space on each of a plurality of displays, the display target region being set in different positions for each of the plurality of displays; and
placing an advertisement object corresponding to the object group generated in an overlapping region of a plurality of display target regions respectively corresponding to the plurality of displays in a case where the object group is included in the overlapping region.

11. A non-transitory computer-readable information storage medium storing a program for causing a computer to:
determine whether or not a position within a virtual two-dimensional plane or a virtual three-dimensional space, where one of a first object and a second object is placed, is included in a determination region within the virtual two-dimensional plane or the virtual three-dimensional space that is based on a position within the virtual two-dimensional plane or the virtual three-dimensional space where another one of the first object and the second object is placed, in a case where the first object is newly placed in the virtual two-dimensional plane or the virtual three-dimensional space based on a user's operation or in a case where the position of the first object is updated based on the user's operation;
obtain a similarity degree between attribute information associated with the first object and attribute information associated with the second object, and determine whether the similarity degree is higher than a threshold;
group the first object and the second object in a case where it is determined that the position within the virtual two-dimensional plane or the virtual three-dimensional space, where the one of the first object and the second object is placed, is included in the determination region that is set within the virtual two-dimensional plane or the virtual three-dimensional space and it is determined that the similarity degree is higher than the threshold;
display a screen indicating a display target region of the virtual two-dimensional plane or the virtual three-dimensional space on each of a plurality of displays, the display target region being set in different positions for each of the plurality of displays; and
place an advertisement object corresponding to the object group generated in an overlapping region of a plurality of display target regions respectively corresponding to the plurality of displays in a case where the object group is included in the overlapping region.

* * * * *